(12) United States Patent
Akhalwaya et al.

(10) Patent No.: US 12,159,195 B2
(45) Date of Patent: Dec. 3, 2024

(54) SHORT-DEPTH ACTIVE LEARNING QUANTUM AMPLITUDE ESTIMATION WITHOUT EIGENSTATE COLLAPSE

(71) Applicant: International Business Machines Corporation, Armonk, NY (US)

(72) Inventors: Ismail Yunus Akhalwaya, Emmarentia (ZA); Kenneth Clarkson, Madison, NJ (US); Lior Horesh, North Salem, NY (US); Mark Squillante, Greenwich, CT (US); Shashanka Ubaru, Ossining, NY (US); Vasileios Kalantzis, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/193,082

(22) Filed: Mar. 30, 2023

(65) Prior Publication Data
US 2024/0193448 A1    Jun. 13, 2024

Related U.S. Application Data

(62) Division of application No. 16/778,878, filed on Jan. 31, 2020, now Pat. No. 11,657,312.

(51) Int. Cl.
*G06N 10/00* (2022.01)
*G06F 17/11* (2006.01)
*G06N 20/00* (2019.01)

(52) U.S. Cl.
CPC ............. *G06N 10/00* (2019.01); *G06F 17/11* (2013.01); *G06N 20/00* (2019.01)

(58) Field of Classification Search
USPC .......................................................... 706/62
See application file for complete search history.

(56) References Cited

U.S. PATENT DOCUMENTS

| 11,157,817 B2* | 10/2021 | Rolfe ..................... G06N 3/086 |
| 11,468,293 B2* | 10/2022 | Chudak ................. G06N 3/045 |

(Continued)

OTHER PUBLICATIONS

Peruzzo et al., "A Variational Eigenvalue Solver on a Photonic Quantum Processor," Nature communications 5: 4213, URL: https://www.nature.com/articles/ncomms5213?origin=ppub, (2014), 7 pages.

(Continued)

*Primary Examiner* — Mohammed Alam
(74) *Attorney, Agent, or Firm* — Amin, Turocy & Watson, LLP

(57) ABSTRACT

Techniques and a system to facilitate estimation of a quantum phase, and more specifically, to facilitate estimation of an expectation value of a quantum state, by utilizing a hybrid of quantum and classical methods are provided. In one example, a system is provided. The system can comprise a memory that stores computer executable components and a processor that executes the computer executable components stored in the memory. The computer executable components can include an encoding component and a learning component. The encoding component can encode an expectation value associated with a quantum state. The learning component can utilize stochastic inference to determine the expectation value based on an uncollapsed eigenvalue pair.

20 Claims, 14 Drawing Sheets

(56) References Cited

U.S. PATENT DOCUMENTS

| | | | |
|---|---|---|---|
| 11,481,669 B2* | 10/2022 | Rolfe | G06N 3/044 |
| 2003/0164490 A1 | 9/2003 | Blais | |
| 2007/0239366 A1 | 10/2007 | Hilton et al. | |
| 2015/0046457 A1* | 2/2015 | Weinstein | G06F 18/232 707/737 |
| 2017/0255629 A1 | 9/2017 | Thom et al. | |
| 2018/0238869 A1 | 8/2018 | Kauffman et al. | |
| 2019/0087965 A1* | 3/2019 | Datta | G06T 7/251 |
| 2020/0393798 A1* | 12/2020 | Kushibe | G05B 13/041 |
| 2021/0166133 A1* | 6/2021 | Ronagh | G06F 9/45504 |
| 2021/0374611 A1* | 12/2021 | Ronagh | G06N 3/084 |

OTHER PUBLICATIONS

McClean et al., "The Theory of Variational Hybrid Quantum-Classical Algorithms," New Journal of Physics 18, No. 2 (2016), 23 pages.

Kandala et al., "Hardware-Efficient Variational Quantum Eigensolver for Small Molecules and Quantum Magnets," Nature 549, No. 7671: 242, (2017), 24 pages.

Gilyen et al., "Optimizing Quantum Optimization Algorithms Via Faster Quantum Gradient Computation," Proceedings of the Thirtieth Annual ACM-SIAM Symposium on Discrete Algorithms (SODA '19), Society for Industrial and Applied Mathematics, Philadelphia, PA, USA, 1425-1444, (2019), 20 pages.

Svore et al., "Faster Phase Estimation," arXiv: 1304.0741v1 [quant-ph] April (2013), 14 pages.

Wiebe et al., "Efficient Bayesian Phase Estimation," arXiv:1508.00869vl [quant-ph] August (2015), 12 pages.

Wang et al., "A Generalized Variational Quantum Eigensolver," arXiv:1802.00171v2 [quant-ph] June (2018), 10 pages.

Knill et al., "Optimal Quantum Measurements of Expectation Values of Observables," arXiv:quant-ph/0607019v1 July (2006), 22 pages.

Harrow, et al. "Adaptive Quantum Simulated Annealing for Bayesian Inference and Estimating Partition Functions," arXiv: 1907.09965v1 [quant-ph] Jul. 23, 2019, 28 pages.

Wang, et al., "Accelerated Variational Quantum Eigensolver," arXiv:1802.00171v3 [quant-ph] Mar. 25, 2019, 11 pages.

Non-Final Office Action received for U.S. Appl. No. 16/778,878, dated Sep. 21, 2022, 19 pages.

Notice of Allowance received for U.S. Appl. No. 16/778,878, dated Jan. 11, 2023, 19 pages.

Notice of Allowance received for U.S. Appl. No. 16/778,878, dated Jan. 30, 2023, 24 pages.

List of IBM Patents or Applications Treated as Related.

* cited by examiner

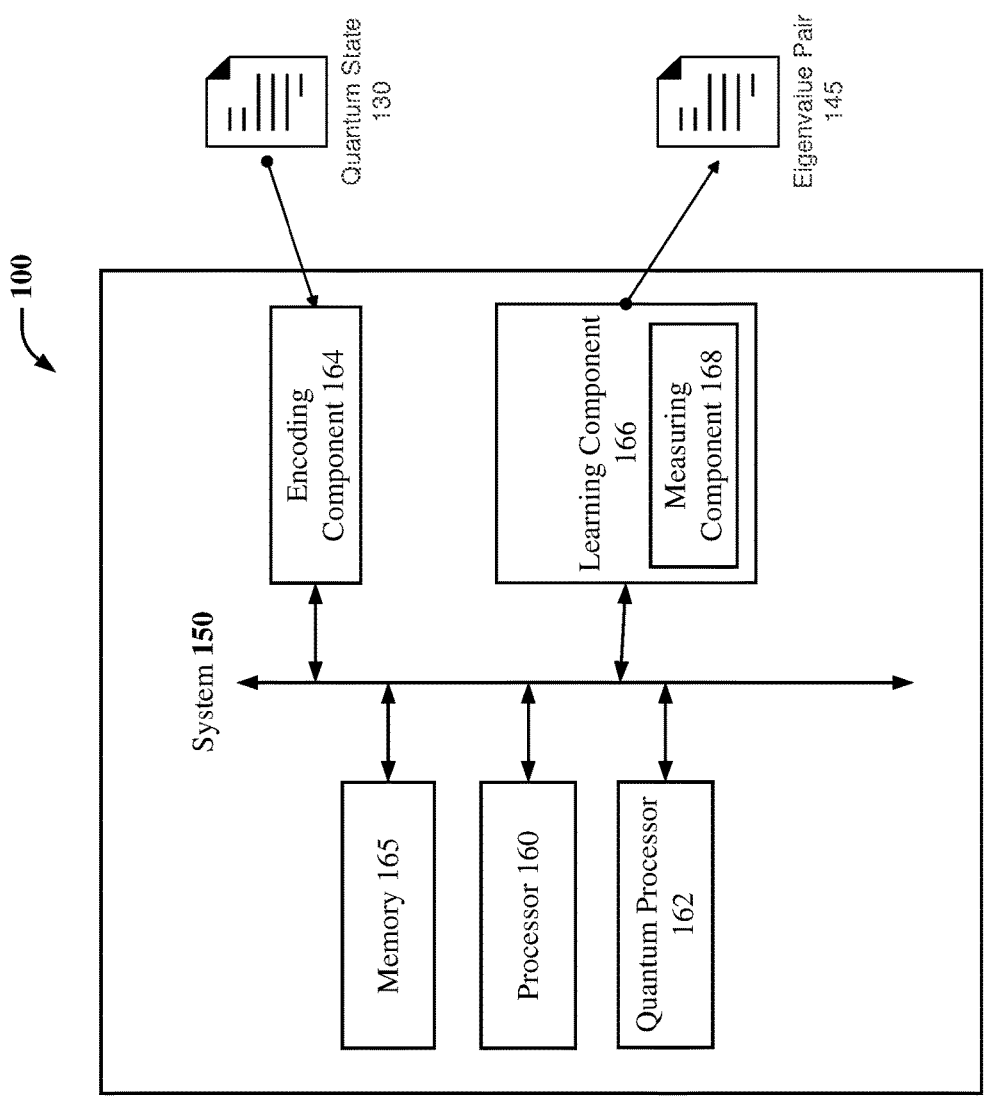

202 →

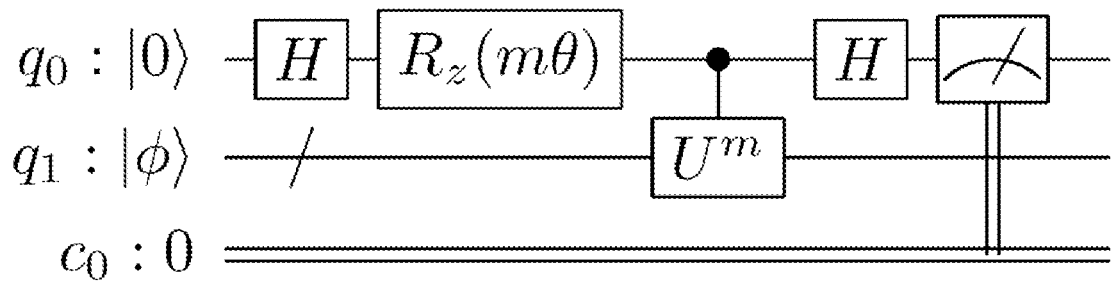

260 →   A  B    C      D    E where, $R_z(m\theta) = e^{im\theta Z/2}$ and $U|\phi\rangle = e^{i\phi}|\phi\rangle$

203 →

$A : |0\rangle \otimes |\phi\rangle$ $B : \frac{1}{\sqrt{2}}(|0\rangle + |1\rangle) \otimes |\phi\rangle$ $C : \frac{1}{\sqrt{2}}(e^{im\theta/2}|0\rangle + e^{-im\theta/2}|1\rangle) \otimes |\phi\rangle$ $D : \frac{1}{\sqrt{2}}(e^{im\theta/2}|0\rangle + e^{-im(\theta/2-\phi)}|1\rangle) \otimes |\phi\rangle$ $E : \frac{1}{\sqrt{2}}((e^{im\theta/2} + e^{-im(\theta/2-\phi)})|0\rangle + (e^{im\theta/2} - e^{-im(\theta/2-\phi)})|1\rangle) \otimes |\phi\rangle$

SHORT-DEPTH ACTIVE LEARNING QUANTUM AMPLITUDE ESTIMATION WITHOUT EIGENSTATE COLLAPSE

STATEMENT REGARDING FEDERALLY SPONSORED RESEARCH OR DEVELOPMENT

This invention was made with Government support under Contract No.: FA8750-18-C-0098, awarded by U.S. Air Force, Office of Scientific Research (AFOSR). The Government has certain rights to this invention.

BACKGROUND

The subject disclosure relates to estimation of a quantum state's phase, and more specifically, to estimation of a quantum state's phase utilizing the estimation of the amplitude between two quantum states, and more specifically, to the estimation of the amplitude utilizing a hybrid of quantum and classical methods.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating estimation of a quantum state's phase, and more specifically, facilitating estimation of a quantum state phase utilizing a hybrid of quantum and classical methods.

According to an embodiment, a system is provided. The system can comprise a memory that stores computer executable components and a processor that executes the computer executable components stored in the memory. The computer executable components can include learning component that can utilize stochastic inference to determine an expectation value based on an uncollapsed eigenvalue pair. The computer executable components can further include an encoding component that can encode the expectation value associated with a quantum state.

According to an embodiment, a system is provided. The system can comprise a memory that stores computer executable components and a processor that executes the computer executable components stored in the memory. The computer executable components can include a learning component. The learning component can utilize stochastic inference to determine an expectation value based on an uncollapsed eigenvalue pair. The learning component can include a measuring component that can probabilistically measure the expectation value, with the measuring component being independent of an input state.

According to another embodiment, a computer-implemented method is provided. The computer-implemented method can comprise learning, by a system operatively coupled to a processor, an expectation value based on a quantum state based on an uncollapsed eigenvalue pair, by stochastic inference. In some embodiments, the learning can comprise measuring, by the system, the expectation value probabilistically, with the measuring being independent of an input state. The method can further comprise encoding, by the system, an expectation value associated with a quantum state, as a phase.

According to another embodiment, a computer-implemented method is provided. The computer-implemented method can comprise encoding, by a system operatively coupled to a processor an expectation value associated with a quantum state. The method can further comprise learning, by the system, by stochastic inference, the expectation value based on an uncollapsed eigenvalue pair.

According to yet another embodiment, a computer program product facilitating phase estimation of a quantum state can comprise a computer readable storage medium having program instructions embodied therewith. The program instructions can be executable by a processor and cause the processor to encode, by the processor, an expectation value associated with a quantum state. Further, the program instructions can cause the processor to learn, by utilizing a stochastic inference, the expectation value based on an uncollapsed eigenvalue pair.

DESCRIPTION OF THE DRAWINGS

FIG. 1 illustrates a block diagram of an example, non-limiting system that can generate an eigenvalue from a quantum state in accordance with one or more embodiments described herein.

FIG. 2A illustrates an example approach that can use a circuit to select a control parameter m that can be used by an encoding component to encode an expectation value in the phase of a quantum state, in accordance with one or more embodiments.

DETAILED DESCRIPTION

Figure 2B:
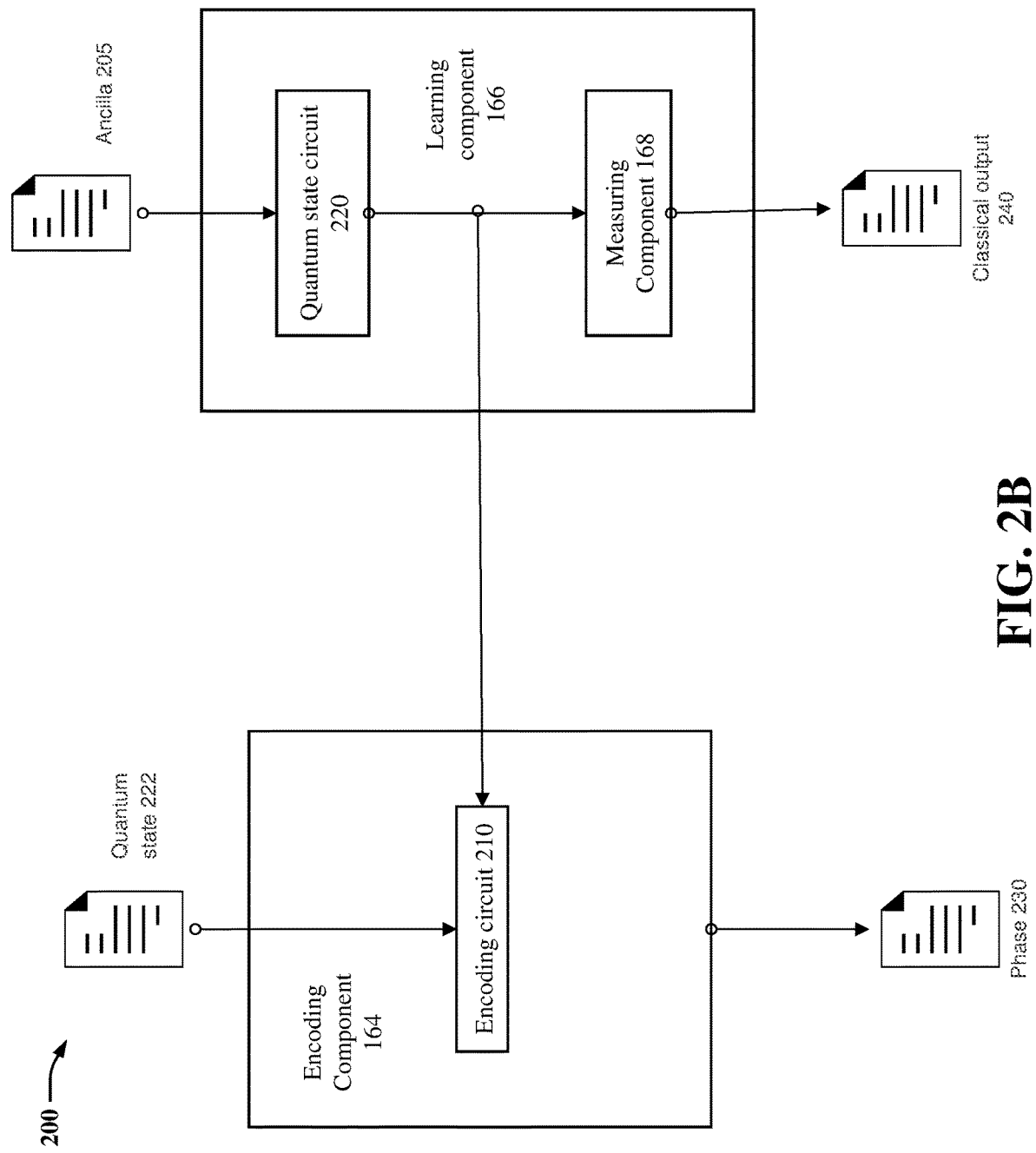
FIG. 2B illustrates a block diagram of an example, non-limiting system that shows the interaction of the encoding component and learning component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing employs quantum physics principles such as the superposition principle and entanglement to encode information rather than binary digital techniques. For example, a quantum circuit can employ quantum bits (e.g., qubits) that operate according to the superposition principle of quantum physics and the entanglement principle of quantum physics. The superposition principle of quantum physics allows each qubit to represent both a value of "1" and a value of "0" at the same time. The entanglement principle of quantum physics states allows qubits in a superposition to be correlated with each other. For instance, a state of a first value (e.g., a value of "1" or a value of "0") can depend on a state of a second value. As such, a quantum circuit can employ qubits to encode information rather than binary digital techniques based on transistors. However, design of a quantum circuit can be generally difficult and/or time consuming as compared to conventional binary digital devices. Furthermore, it is generally desirable to increase efficiency of a quantum circuit and/or a quantum computing process. As such, design of a quantum circuit and/or quantum computing processing can be improved.

To address these and/or other issues, embodiments described herein include systems, computer-implemented methods, and computer program products facilitating quantum computation. In one embodiment, provided is a system comprising a memory that stores computer executable components, and a processor that executes the computer executable components stored in the memory, wherein the computer executable components comprise an encoding component that encodes an expectation value in the phase of a quantum state; and a learning component that utilizes stochastic inference to determine an eigenvalue corresponding to the expectation value. The system can include a quantum processor. In an aspect, the encoding component can encode the expectation value as a phase. According to certain embodiments, the encoding component can encode the expectation value based on an amplitude of the expectation value. In some embodiments, the stochastic inference can employ Bayesian learning. The learning component can include a measuring component. The measuring component can utilize at least one ancilla qubit to determine the eigenvalue corresponding to the expectation value. The measuring component can produce an output comprising a probabilistic measurement. The probabilistic measurement can be based on the at least one ancilla qubit.

In another embodiment, provided is a system comprising a memory that stores computer executable components, and a processor that executes the computer executable components stored in the memory, wherein the computer executable components comprise a learning component that utilizes stochastic inference to determine an eigenvalue corresponding to an expectation value based on a the phase of a quantum state, wherein the learning component comprises a measuring component that probabilistically measures the expectation value, wherein the measuring component is independent of an input state. The system can include a quantum processor. The system can further comprise an encoding component that encodes the expectation value based on the phase of a quantum state. The encoding component can encode the expectation value as a phase. In some embodiments, the encoding component can encode the expectation value based on an amplitude of the expectation value. In some embodiments, the stochastic inference can comprise Bayesian learning, which can include Bayesian inference. According to certain embodiments, the measuring component can utilize at least one ancilla qubit to determine the eigenvalue corresponding to the expectation value.

In another embodiment, provided is a computer-implemented method comprising encoding, by a system operatively coupled to a processor, an expectation value associated with the phase of a quantum state; and learning, by the system, an eigenvalue corresponding to the expectation value by stochastic inference. The system can include a quantum processor. According to certain embodiments, the expectation value can be encoded as a phase. In some embodiments, the expectation value can be encoded based on an amplitude of the expectation value. In an aspect, the stochastic inference can include Bayesian learning, which can include Bayesian inference. Learning an eigenvalue can include measuring, by the system, the eigenvalue corresponding to the expectation value by utilizing at least one ancilla qubit. Measuring can produce an output comprising a probabilistic measurement, wherein the probabilistic measurement is based on the at least one ancilla qubit.

In another embodiment, provided is a computer-implemented method comprising: learning, by a system operatively coupled to a processor, an eigenvalue corresponding to an expectation value based on a quantum state by stochastic inference, wherein learning comprises measuring, by the system, the expectation value probabilistically, wherein the measuring is independent of an input state. The system can include a quantum processor. The method can further include encoding, by the system, the expectation value as a phase. The encoding can be based on an amplitude of the expectation value. The stochastic inference can include Bayesian learning, which can include Bayesian inference.

FIG. 1 illustrates a block diagram of an example, non-limiting system that can generate an eigenvalue from a quantum state in accordance with one or more embodiments described herein. According to multiple embodiments, the system 150 can include memory 165 can store one or more computer and/or machine readable, writable, and/or executable components and/or instructions that, when coupled with a processor 160 and/or quantum processor 162, can facilitate performance of operations defined by the executable components and/or instructions. The quantum processor 162 can be a machine that performs a set of calculations based on principles of quantum physics. For instance, the quantum processor 162 can perform one or more quantum computations employing a set of quantum circuits. Furthermore, the quantum processor 162 can encode information using qubits which can store information in superposition. Memory 165 can store computer and/or machine readable, writable, and/or executable components and/or instructions that, when executed by a processor 160 or quantum processor 162, can facilitate execution of the various functions described herein relating to the system 150, including encoding component 164, learning component 166, and measuring component 168. The encoding component 164 can be operatively coupled to both a processor 160 and quantum processor 162. The quantum processor 162 can encode based on instructions that are formed and administrated to the quantum processor 162 by a processor 160. The processor 160 can receive quantum measurements, perform Bayesian learning, determine experimental parameters, update probability/prior parameters, and translate them into instructions for the quantum processor 162.

As described with FIGS. 2-11 below, system 150 can generate an eigenvalue pair 145 from two quantum states 130 in accordance with one or more embodiments described herein. One having skill in the relevant art(s), given the description herein, would appreciate that, as discussed herein, without departing from the spirit of one or more embodiments described herein, eigenvalue can broadly refer to an eigenvector, an eigenvalue, as well as an eigenpair of these components.

In one or more embodiments, quantum state 130 can be any state of a quantized system that is represented by quantum numbers, wherein the quantum numbers can be numbers that describe the values of conserved quantities in a quantum system. The quantum state 130 can be employed with technologies such as, but not limited to, quantum processing technologies, quantum circuit technologies, quantum computing design technologies, artificial intelligence technologies, machine learning technologies, search engine technologies, image recognition technologies, speech recognition technologies, model reduction technologies, iterative linear solver technologies, data mining technologies, healthcare technologies, pharmaceutical technologies, biotechnology technologies, finance technologies, chemistry technologies, material discovery technologies, vibration analysis technologies, geological technologies, aviation technologies, and/or other technologies. As a quantum state 130 can be any state of a quantized system that is represented by quantum numbers, wherein the quantum numbers can be numbers that describe the values of conserved quantities in a quantum system, the quantum state 130 can represent properties of systems in these technologies.

In one or more embodiments, quantum state 130 can comprise an associated expectation value. The expectation value can be a statistical mean of measured values of an observable property, which can be the result of a linear operator operating on a Hilbert space. The encoding component 164 can encode an expectation value in the phase of a quantum state 130. The encoding component 164 can receive an at least partial quantum state and encode the expectation value as a phase. The phase can be encoded by successive iterations of a circuit that effectively multiply a quantum state 130 by a complex exponential that includes an amplitude. The encoding component 164 can encode the expectation value based on an amplitude of the expectation value. The encoding component 164 can execute on a quantum processor 162. The encoding component 164 can encode a spectrum or an eigenvalue as a phase which can be inferred utilizing the processor 160.

The learning component 166 can utilize stochastic inference to determine an eigenvalue pair 145 corresponding to the expectation value. Stochastic inference can comprise Bayesian learning. The learning component can utilize a quantum processor 162 and a processor 160.

Stochastic inference can include updating the posterior probability portion of Bayes' law based on obtaining at least one updated sample in a Bayesian learning process. Exploiting Bayes' law in this fashion, a measuring component 168 can measure the at least one ancilla qubit to provide a probabilistic output that reveals information about an eigenvalue pair 145. The learning component can include a measuring component 168 that can utilize at least one ancilla qubit to determine the eigenvalue pair 145 corresponding to the expectation value. An ancilla qubit can be a qubit that can be used to store temporary information that can be neither an input qubit nor an output qubit.

The learning component 166 can receive at least one ancilla qubit 205 (e.g. by a learning component 166 comprising a quantum circuit 220). The quantum circuit 220 can include a Pauli rotation that depends on a control parameter $\theta$. The control parameter $\theta$ can depend on the prior, including the approximation parameter, $\mu$. The control parameter m of the circuit can determine an amount of controlled unitary action that can be utilized by an encoding component 164. The control parameter m can be determined by the prior, including the variance, $\sigma$.

FIG. 2A illustrates an example approach that can use circuit 202 to select a control parameter m that can be used by encoding component 164 to encode an expectation value in the phase of a quantum state 130, in accordance with one or more embodiments. Repetitive description of like elements employed in other embodiments described herein is omitted for sake of brevity.

In one or more embodiments, the intuition for control parameter m can be the same as in the full phase estimation algorithm. One having skill in the relevant art(s) given the description herein, would appreciate that circuit 202 can be used to, peel away m copies of the eigenvalue. In another use of circuit 202, using the full algorithm, control parameter m can run through powers of two, and select a value for control parameter m that can maximize the information gain at each step.

Considering the above in greater detail, circuit 202 can, in one or more embodiments, use formulas 203 for points 260 A-E, to determine control parameter m, in accordance with one or more embodiments. in an example of this process, point 260 D corresponds to a 'phase kick-back' that can leave the eigenvector register unchanged, but change the phase of the control qubit. Additional discussion of the encoding process of encoding component 164 is included with a discussion of different approaches to measuring, discussed below.

FIG. 2B illustrates a block diagram of an example, non-limiting system 200 that shows the interaction of the encoding component 164 and learning component 166 in accordance with one or more embodiments described herein. Repetitive description of like elements employed in other embodiments described herein is omitted for sake of brevity.

The quantum circuit 220 encodes at least one ancilla qubit 205 qubit into a quantum state for measuring 222 that can be received by the encoding component 164. The quantum circuit 220 encodes at least one ancilla qubit 205 qubit into a quantum state for measuring 222 that can be received by the measuring component 168. The quantum circuit 220 of the learning component can be executed on a quantum circuit operatively connected to a quantum processor 162.

The measuring component 168 can produce an output comprising a probabilistic measurement. The probabilistic measurement can be based on at least one ancilla qubit. The learning component 166 can execute partially on a quantum processor 162 and partially on the processor 160; the measuring component 168 can interface between a quantum portion, utilizing the quantum processor 162, and a classical portion, utilizing the processor 160.

The measuring component 168 can learn/approximate the eigenvalue pair 145 by Bayesian learning, which can include Bayesian inference. Exploiting Bayes' law, the probability of a particular phase 230 ($\varphi$), given outcome (E), a variance, $\sigma$, and a mean of the initial prior function. For example, Bayesian analysis can begin with a prior over $\phi$, namely $P_0(\phi)$ and can proceed by the formulas below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i, m_i) = \frac{P(E_{i+1} \mid \phi; \theta_i, m_i) P_i(\phi)}{N}$$

$P(\varphi)$ can be updated each sample by the update component 504. The measuring component 168 can send its output to an update component. The update component can receive probabilistic output from the measuring component 168 and utilize that probabilistic output to provide a new estimate of the eigenvalue pair 145 to the measuring component 168. The measuring component 168 can include a classical statistical model based on a sampling filter, which can filter based on stochastic inference. The measuring component 168 can perform a quantum measurement on the output of the encoding component 164. Based on a classical value output of the quantum measurement, successive iterations can produce a classical output 240.

Figure 3:
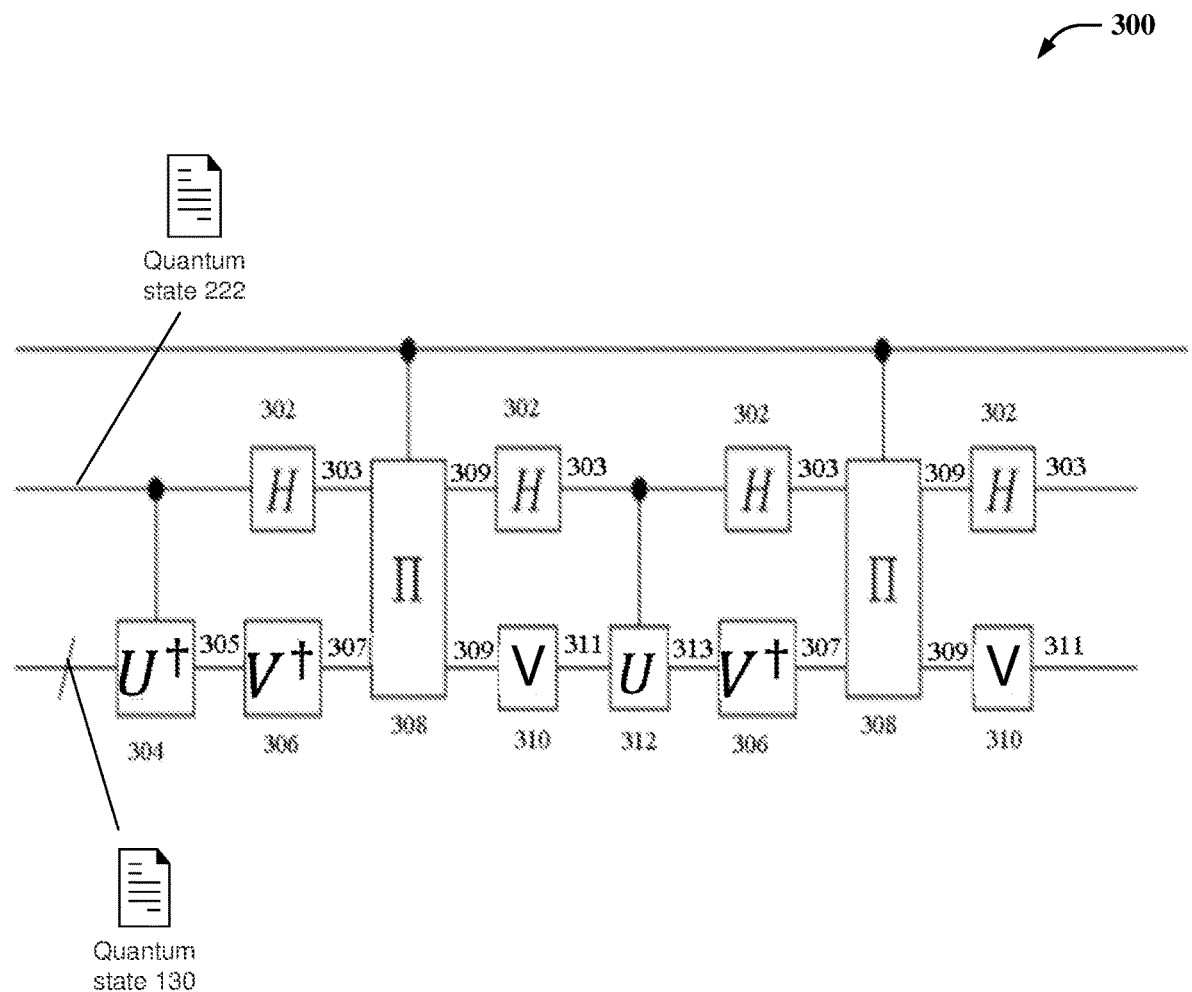
FIG. 3 illustrates an example, non-limiting circuit that shows an encoding component in accordance with one or more embodiments described herein.

The Quantum Phase Estimation method can employ a circuit depth that is technologically unfeasible with near term quantum computing. To circumvent this, a portion of the circuit depth is replaced with a classical statistical model based upon a sampling filter. In preparation, a quantum measurement is performed on the last stage of the encoding circuit 300, as shown in FIG. 3, and the measurement is done in a certain basis, |k>. After the quantum measurement is performed giving a classical value, iterations the realizations of the circuit to produce an ensemble.

One or more embodiments can perform amplitude estimation using different approaches. In one approach to amplitude estimation that saturates the Heisenberg limit is to use Quantum Phase Estimation. Quantum Phase Estimation can employ entanglement (via the inverse Quantum Fourier Transform) between repeated applications of U to extract the phase. An iterative version of Quantum Phase Estimation exists that can use feed-forward measurements instead of entanglement.

In one approach to using phase estimation to do amplitude estimation, first the amplitude can be encoded into the phase, second, an operator can be defined for which eigenvectors are known, e.g., because phase estimation relies on its preparation. In some circumstances, the U from amplitude estimation can be arbitrary, and neither eigenvalue pairs 145 nor eigenvectors are known a priori.

In one approach to defining the operator, a new rotation operator, S (related to U) can be built that, by design, can leave a certain subspace invariant. In this approach, because S can be a two-dimensional rotation the form of the two eigenvalue pairs 145 is: $e^{\pm i\phi}$. Furthermore, because in some circumstances there are only two eigenvalue pairs 145 which differ only with respect to the signs of their phases, as long as the initial state is prepared within the subspace, "both" phases can be determined in one run of full quantum phase estimation. One having skill in the relevant art(s), given the disclosure herein, would appreciate that one or more embodiments can use this dual eigenvalue property in a Bayesian iterative context, e.g., without using an iterative algorithm that can require projection onto one of the eigenvectors.

In an example below, the following operator can have the above described beneficial properties, with a rotation by $\phi=|\langle\psi|U|\psi\rangle|$ that operates, in this example, only in a two-dimensional subspace (spanned by $|\psi_0\rangle$ and $|\psi_1\rangle$):

$$S = S_0 S_1$$

$$S_0 = \mathbb{I} - 2|\psi_0\rangle\langle\psi_0|$$

$$S_1 = \mathbb{I} - 2|\psi_1\rangle\langle\psi_1| = \mathbb{I} - 2U|\psi_0\rangle\langle\psi_0|U^\dagger$$

where $S_x|\psi\rangle$, $x \in \{0,1\}$ is a sign flip of the component of $|\psi\rangle$ in the direction of $|\psi_x\rangle$. Each $S_x$ can operate in a two dimensional subspace spanned by the state being acted upon and $|\psi_x\rangle$. Therefore, if the process is started in the sub-space spanned by $|\psi_0\rangle$ and $|\psi_1\rangle$, the results can be determined by remaining in the sub-space.

In one or more embodiments, a sign flip of the component in the direction of a vector can be a reflection around the line perpendicular to the vector, e.g., one or more embodiments can evaluate reflections about axes. In an example implementation, two reflections around the same axes can return a vector to where it began, and two reflections about two non-coinciding axes can rotate the vector by exactly twice the angle between the two axes. This can be illustrated by how a reflection about the second axis can be seen as rotation to the first axis, followed by reflection about the second axis, picking up a rotation of twice the angle between the axis followed by a rotation of the same angle as the first. Based at least on these reflections, the angle of separation can be transferred between two vectors (this being related to the inner-product between the two vectors) into the angle of rotation of any vector in the plane. In one or more embodiments, S can be a (real) rotation by an angle $\phi = 2\cos^{-1}(|\langle\psi_0|\psi_1\rangle|)$, therefore $|\langle\psi_0|\psi_1\rangle| = |\cos(\phi/2)|$.

In one or more embodiments, sign flips along an arbitrary vector can be written as a sign flip $\pi$ along the zero vector $|0\rangle$, by rotating to the zero vector, performing the sign flip $\pi$ and rotating back. Therefore, if the construction of $|\psi_0\rangle$ is specified as the unitary V acting on $|0\rangle$, then:

$$S_0 = V\pi V^\dagger$$

$$S_1 = UV\pi V^\dagger U^\dagger$$

$$S = V\pi V^\dagger U V\pi V^\dagger U^\dagger$$

Thus, full phase estimation of S operating on $|\psi_0\rangle$ can reveal either $\phi$ or $-\phi$ and therefore can result in the desired amplitude.

In some circumstances a 'phase kick-back' can leave the eigenvector register unchanged but can be seen as changing the phase of the control qubit.

Therefore:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

The measuring component 168 can produce an accurate measurement without many samples by measuring intelligently, e.g., in a strategic way. This probabilistic measurement by the measuring component 168 can utilize Bayesian learning and stochastic inference upon the quantum results. The measuring component 168 can perform these tasks by updating a prior distribution using Bayes' law.

The eigenvalue pair 145 can be a value corresponding to the expectation value in the phase of the quantum state 130. The eigenvalue pair 145 can be a value of an observable physical quality of a linear operator operating on a Hilbert space. A Hilbert space is a vector space that is topologically closed under finite vector addition and scalar multiplication with an inner product that allows properties like length and angle to be measured. For any observable physical quantity, there exists a linear operator, which can be a Hermitian operator, acting on the physical environment, which can be a Hilbert space. When we make a measurement of property in the environment, we obtain one of the eigenvalues of the operator. Therefore, any observable physical quantity can be modeled as the eigenvalue of a linear operator operating on a Hilbert space.

The encoding component 164 can receive a quantum state 130. The encoding component 164 can encode a spectrum or an eigenvalue as a phase 230, which can then be inferred classically, by a processor 160. The classical inference can be performed by the measuring component 168 by exploiting Bayes' law, as the probability of a particular phase 230 (φ), given outcome (E), a variance, σ, and a mean of the initial prior function. For example, Bayesian analysis can begin with a prior over φ, namely $P_0(\phi)$ and can proceed by the formulae below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i, m_i) = \frac{P(E_{i+1} \mid \phi; \theta_i, m_i) P_i(\phi)}{N}$$

P(φ) can be updated each sample by the update component 504.

The encoding component can utilize a quantum processor 162. The encoding component can send the quantum state 130 to an encoding circuit 210 to encode the quantum state 130 as a phase 230 with an encoding circuit 300, as shown in FIG. 3. The encoding circuit 210 can receive the quantum state 130 and input from the learning component 166. Utilizing the quantum state 130 and input from the learning component 166, the encoding circuit 210 can output a phase 230. This encoding can be performed with an encoding circuit 300. The encoding circuit 300 can be thought of as repeated iterations of S, where $S = S_0 S_1$, wherein $S_0 = V \Pi V^\dagger = I - 2|\psi_0\rangle\langle\psi_0|$ and $S_1 = U \Pi V^\dagger = I - 2U|\psi_0\rangle\langle\psi_0|U^\dagger$. V represents a circuit preparation gate, $V^\dagger$ is the conjugate of V, U represents a unitary operator to infer a spectrum, $U^\dagger$ is the conjugate of U, and $\Pi = I - 2|0\rangle\langle 0|$. Iterations of S lead to encoding the expectation value as a phase, φ(λ), wherein φ(λ)=2 arccos (<ψ(λ)|H|ψ(λ)>). This can encode an expectation value of the quantum state 130, [0>|ψ> as $e^{-i|<\psi(\lambda)|H|\psi(\lambda)\}>|}|0>|\psi>$, wherein |<ψ(λ)|H|ψ(λ)>| can be an amplitude of the expectation value. The learning component 166 receives at least one ancilla qubit 205 and sends the at least one ancilla qubit 205 to a quantum circuit 220. In one or more embodiments, quantum circuit 220 can depend on control parameters m and θ which in turn can depend on the probability/prior parameters μ and σ.

The approximation parameter μ can be set by a Bayesian probability distribution with a tuning parameter, based on active learning (γ). In one or more parameters, active learning can be applied to select new control parameters, potentially revealing better quality information at every Bayesian update step, as discussed above. According to certain embodiments, γ∈[0,1]. The tuning parameter can enable a gradual steering between a quantum estimation and a classical estimation. In some embodiments, a quantum estimation can be used when γ=0 and a classical estimation can be used when γ=1.

Figure 12A:
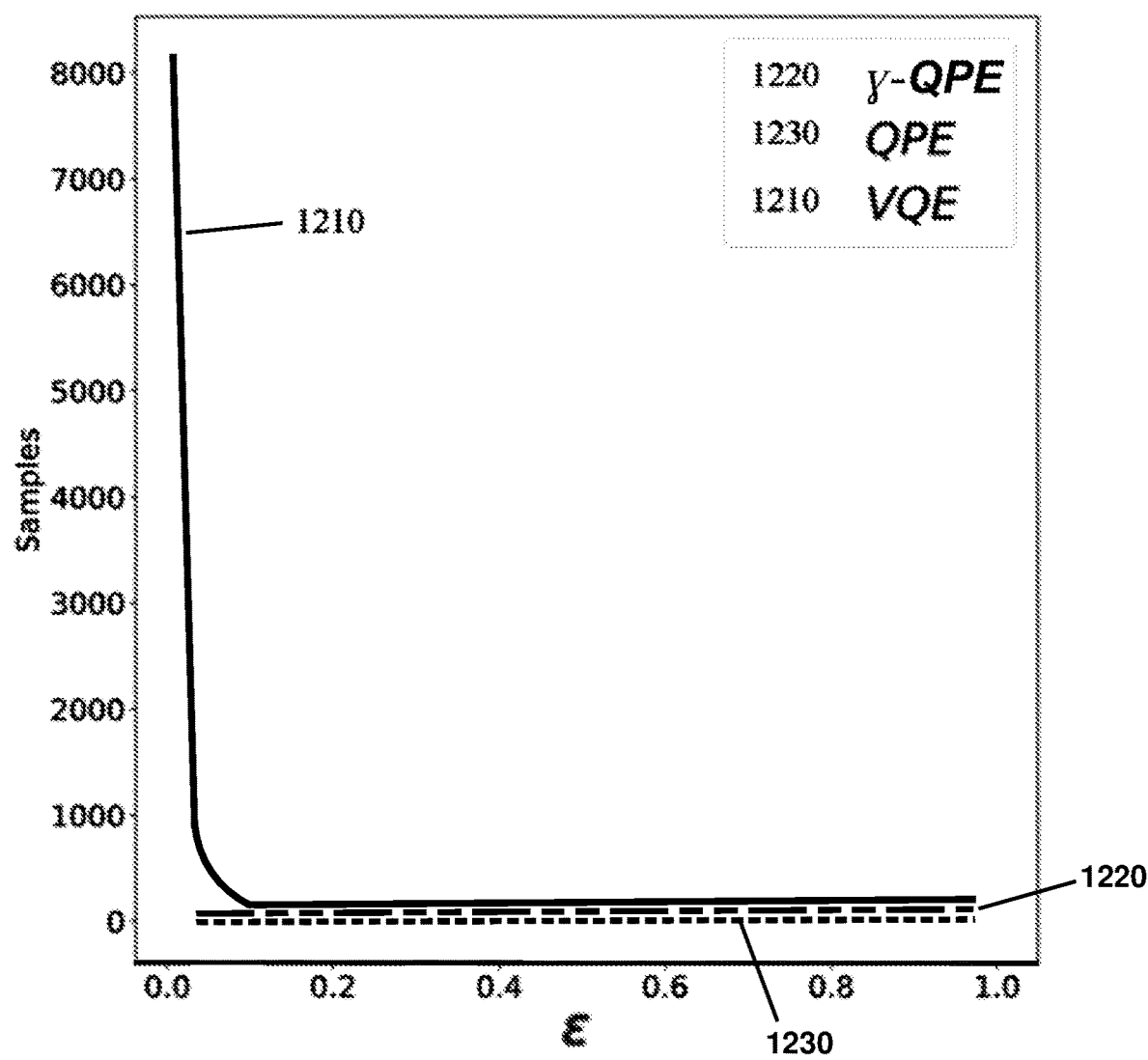
FIGS. 12A and 12B illustrate example, non-limiting graphs showing the samples for a given error $\epsilon$ and circuit depth for a given number of qubits.
Figure 12B:
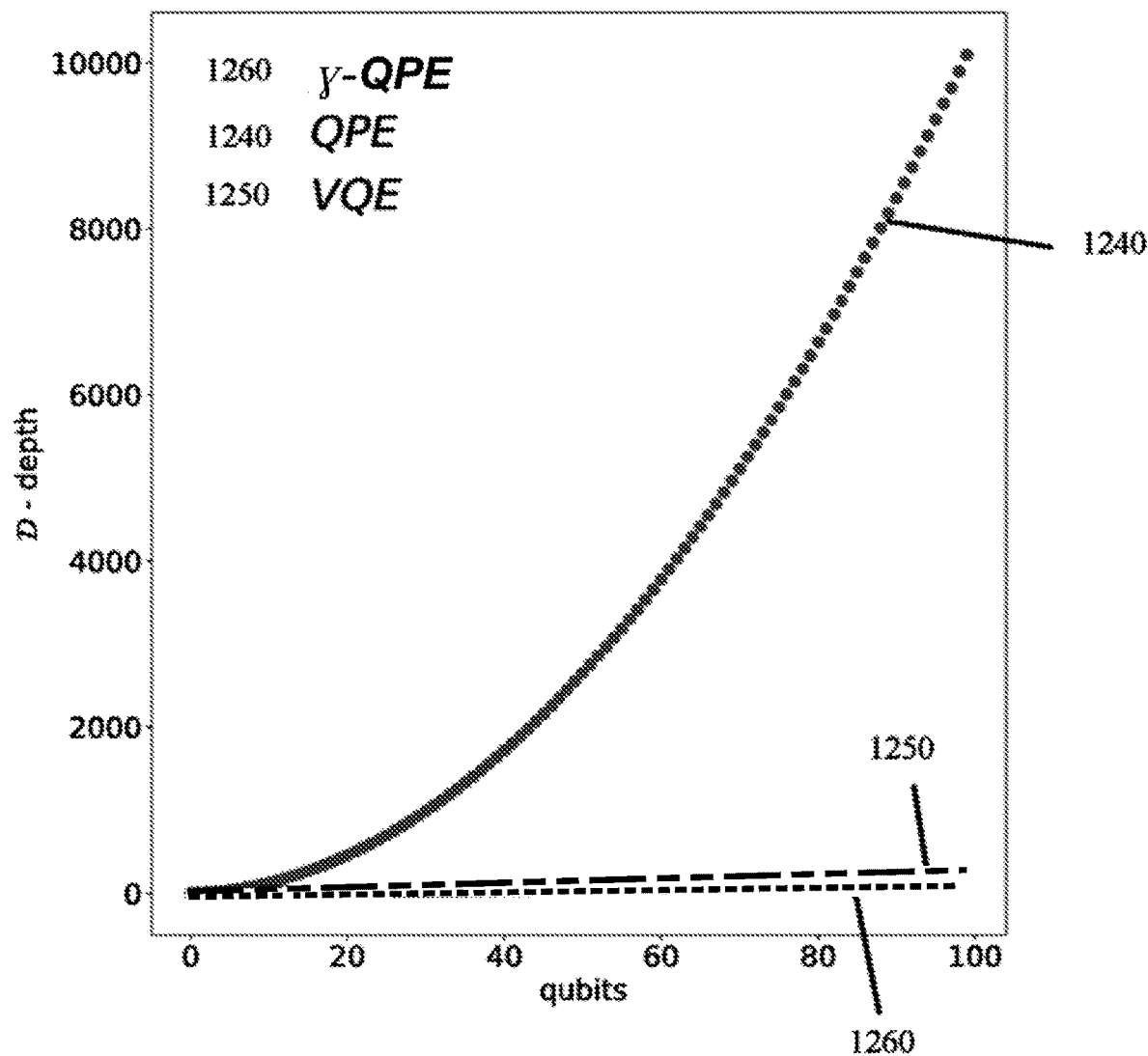

Steering between a quantum estimation and a classical estimation by the encoding component 164 using a tuning parameter, can incorporate some of the lower costs of both quantum and classical algorithms, as shown in FIGS. 12A and 12B. It should be noted that the eigenvector-collapse free method of amplitude estimation described in one or more embodiments herein, can be a subroutine of a determination of VQE, which can confer benefits in some circumstances, with these benefits including shorter depth circuits and fewer samples being required, as compared to naive sampling. In VQE the goal is to produce an approximation to the ground-state and calculate energy (the lowest possible) by varying variational parameters λ.

This is made possible by the variational principle, which states that energy of an arbitrary state is always greater than the ground state. Our amplitude estimation method can be used as a subroutine in VQE to calculate the energy level of the current quantum state, e.g., starting with the ansatz and refining.

The samples which can be employed to achieve a relatively low error ε are very high for VQE 1210. However, even at relatively low errors, γ-QPE 1220 compares quite well with QPE 1230, while not requiring the high fault tolerance of QPE. The circuit depth for a given number of processed qubits goes up very quickly for QPE 1240. However, even at relatively high amounts of processing, γ-QPE 1260 compares favorably with VQE 1250. Quantum algorithms can be used for the solution of linear systems of equations, factorization and eigenvalue decomposition, for example. However, a problem for realizing the potential of some quantum algorithms is that some quantum algorithms can scale proportionally to $\mathcal{O}(1/\varepsilon)$, wherein $\mathcal{O}$ denotes a function of the asymptotic upper bound approaching infinity, to obtain, a level of precision, ε. However, classical algorithms can have a much greater computational cost in terms of sample counts relative to quantum algorithms to form a proficient variational form for the representation of an eigenstate. The computational cost for a classical algorithm can grow proportional to $\mathcal{O}(1/\varepsilon^2)$, however, each realization can necessitate a repeat preparation of the state. By first encoding the expectation value in a quantum manner and preparing it for a classical inference, a substantial speed up can be achieved.

Quantum Phase Estimation (QPE) and Variational Quantum Eigen (VQE) solver are instrumental for the computation of eigenvalues. Quantum Phase Estimation can offer an exponential advantage over classical computation, in simulation of the evolution of the state of n qubits by matrix multiplication. The algorithm can be used in applications such as the solution of linear systems of equations, factorization, eigenvalue decomposition, etc. A key issue for realizing the potential of QPE is that the circuit depth scales like $$O\left(\frac{1}{\epsilon}\right)$$

in order to attain $\epsilon$ precision. A popular alternative is the VQE algorithm that replaces the long coherence of QPE with multiple shorter coherence time expectation realizations. The drawbacks of this algorithm forming a proficient variational form for the representation of the eigenstate, and the cost of computation in terms of sample counts (which grow like $$O\left(\frac{1}{\epsilon^2}\right)$$

for $\epsilon$ error, while repeated preparation of the state for each iteration can be employed for each realization).

A variational quantum phase estimation approach is considered that combines ideas associated with rejection filtering and neural network inference. The present embodiments offer almost continuous steering between VQE and QPE, based upon the availability of computational resources. For this reason, the algorithm is termed herein γ-QPE. In addition to the benefits described above, merits of using a hybrid quantum classical approach include that the hybrid approach can utilize the strength of each domain to obtain the best tradeoff between the error $\epsilon$, circuit depth and the computational complexity.

The quantum circuit 220 encodes the at least one ancilla qubit 205 into a quantum state for measuring 222 and provides input to the encoding circuit 210. The quantum state for measuring 222 can be sent to the measuring component 168, which can measure the ancilla qubit 205 to provide a classical output 240, which can be a probabilistic output and can reveal information about an eigenvalue pair 145. The quantum state for measuring 222 can be a complex valued probability function that represents a probability or probability density for a given value.

FIG. 3 illustrates an example, non-limiting encoding circuit 300 that shows an encoding component in accordance with one or more embodiments described herein. Repetitive description of like elements employed in other embodiments described herein is omitted for sake of brevity.

The encoding circuit 300 can receive a quantum state 130. The encoding circuit 300 passes the eigenstate to 304, which can be a conjugate of a unitary operator, P. P can be any unitary operator that can generate information that can be employed by the encoding circuit 300 to generate an inference of a spectrum. P can be a Hamiltonian. The output 305 of the conjugate of the unitary operator 304 goes to the conjugate of the circuit preparation circuit 306. The output of the circuit preparation circuit 306 goes to the first order projection operator 308. By way of example, the first order projection operator 308, π, can be represented as π=I−2|0><0|, wherein I is the identity matrix. The quantum state for measuring 222 based on the at least one ancilla qubit 205 can be passed to both the conjugate of the unitary operator 304 and to a Hadamard gate 302. The Hadamard gate 302 can receive a single qubit and bring it to a state superposition where its output has an equal probability of being measured classically as either 0 or 1. The Hadamard gate can be represented as a unitary matrix that is a combination of two rotations, 180 degrees about the Z-axis and 90 degrees about the Y-axis. The output 303 of the Hadamard gate 302 can be also passed to the first order projection operator 308, π, can be represented as π=I−2|0><0|, wherein I is the identity matrix. The first order projection operator 308 can be a vacuum projection operator. The output 309 of the first order projection operator 308 can be passed to both another Hadamard gate 302 and to the circuit preparation circuit 310. As shown at the upper portion of FIG. 3, the output of the Hadamard gate 302 can be passed to both another Hadamard gate 302 and to a unitary operator 312. The output 303 of the Hadamard gate 302 can be passed to another first order projection operator 308, which can be represented as π=I−2|0><0|. As shown at the bottom portion of FIG. 3, the output 309 of the first order projection operator 308 goes to a circuit preparation circuit 310. The output 311 of the circuit preparation circuit 310 goes to the unitary operator 312. The output 313 of the unitary operator 312 can be passed to the conjugate of the circuit preparation circuit 306. Like the output 303 of the Hadamard gate 302, the output 307 of the conjugate of the circuit preparation circuit 306 can be passed to the first order projection operator 308.

The output 303 of the first order projection operator 308 can be passed to a Hadamard gate 302 and to a circuit preparation circuit 310. This encoding circuit 300 can be iterated as necessary to reduce error in encoding a phase.

Figure 4:
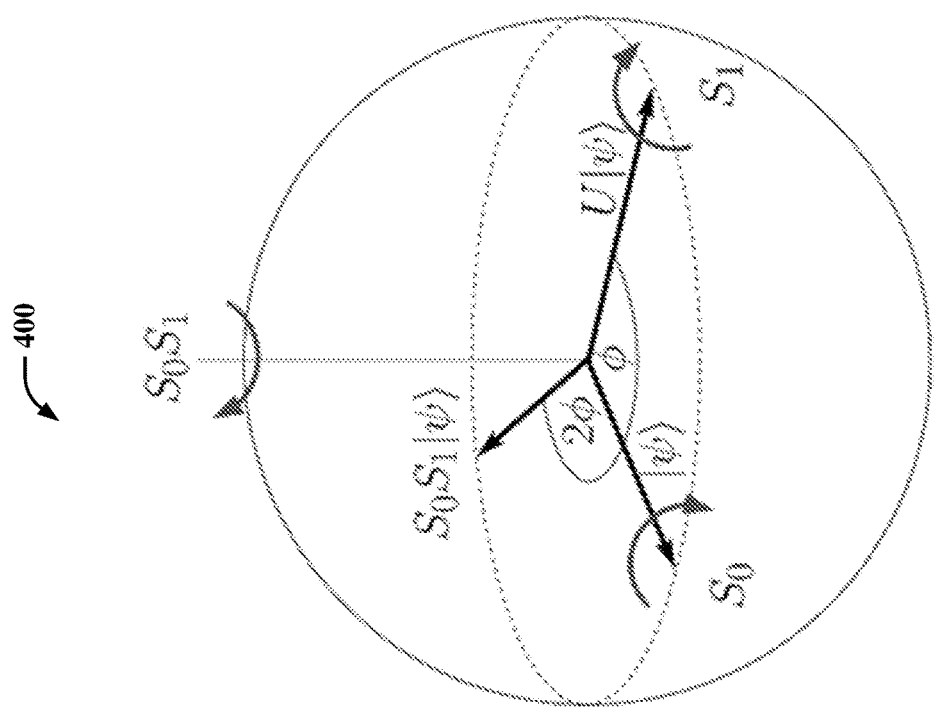
FIG. 4 illustrates an example, non-limiting geometric representation of the example, non-limiting circuit of FIG. 3 in accordance with one or more embodiments described herein.

FIG. 4 illustrates an example, non-limiting geometric representation of the example, non-limiting circuit of FIG. 3. The encoding circuit 300 can encode an absolute expectation value as a phase by a rotation S, where $S=S_0 S_1$. The phase can be measured. The encoding circuit 300 can utilize partial projection operators. Repetitive description of like elements employed in other embodiments described herein is omitted for sake of brevity. As shown on the Bloch sphere 400, geometrically, the circuit of FIG. 3 can be thought of as repeated iterations of S, where $S=S_0 S_1$. wherein $S_0=V\pi V^\dagger=I-2|\psi_0><\psi_0|$ and $S_1=UV\pi V^\dagger U^\dagger=I-2U|\psi_0><\psi_0|U^\dagger$. S can be a rotation by an angle $\phi=2 \arccos \langle\psi(\lambda)|H|\psi(\lambda)\rangle$. $S_0$ and $S_1$ can coincide with the geometrical axis shown in FIG. 4 and can be a geometrical representation and rotation of subset projection operators. The first order projection operator 308 can be a vacuum operator which can be π=I−2|0><0|. Iterations of S lead to encoding the expectation value as a phase, $\varphi(\lambda)$, wherein $\varphi(\lambda)=2 \arccos(<\psi(\lambda)|H|\psi(\lambda)>)$.

Figure 5:
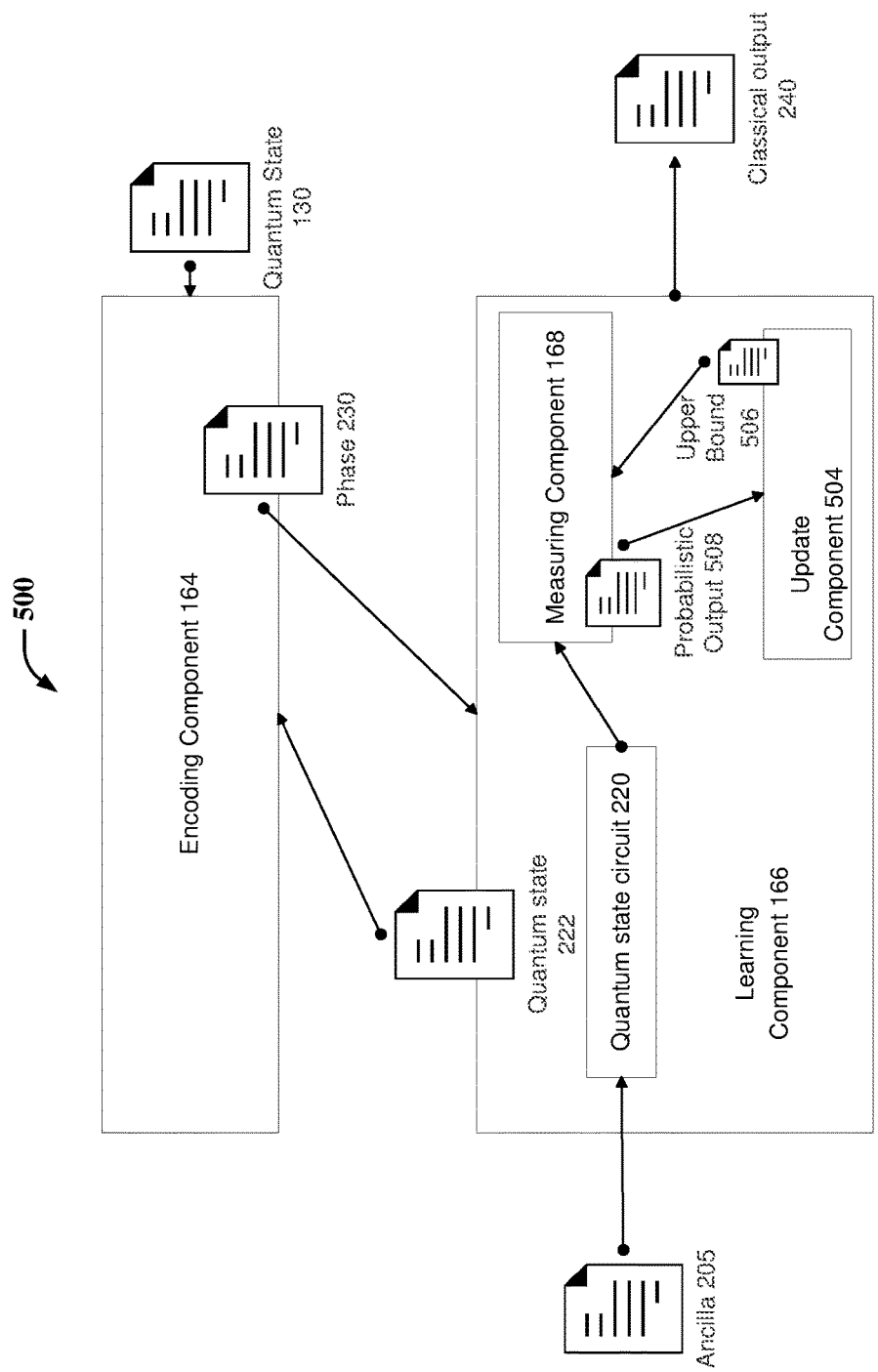
FIG. 5 illustrates a block diagram of an example, non-limiting system that can generate an eigenvalue from a quantum state in accordance with one or more embodiments described herein.

FIG. 5 illustrates a block diagram of an example, non-limiting system that can generate an eigenvalue from a quantum state in accordance with one or more embodiments described herein. Repetitive description of like elements employed in other embodiments described herein is omitted for sake of brevity.

The quantum state 130 can be received by the encoding component 164. The encoding component 164 can encode the quantum state 130 as a phase 230 based on an amplitude of the expectation value of the quantum state 130. The phase 230 can be passed to the learning component 166. The encoding component can be executed by a quantum processor 162.

The learning component 166 can receive an at least one ancilla qubit 205. The at least one ancilla qubit 205 can be received by the quantum circuit 220 of the learning component 166. The quantum circuit 220 can be a Pauli rotation that includes a variance, σ, and a mean of the initial prior function, μ. The quantum circuit 220 encodes at least one ancilla qubit into a quantum state for measuring 222 that can be received by the encoding component 164. The quantum circuit 220 of the learning component 166 can be executed on a quantum circuit operatively connected to a quantum processor 162.

The learning component 166 can comprise a measuring component 168. The measuring component 168 can receive a quantum state for measuring 222 from the quantum circuit 220. The probability of a given outcome, which can be a value corresponding to the expectation value of the quantum state 130, can be calculated explicitly on by the measuring component 168 according to the equation, below, $$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

thereby measuring the eigenvalue probabilistically based on the at least one ancilla qubit. The measuring component can receive the phase 230 from the encoding component 164, represented as $\varphi(\lambda) = 2 \arccos(<\psi(\lambda)|H|\psi(\lambda)>)$.

The encoding component 164 can receive a quantum state 130. The encoding component 164 can encode a spectrum or an eigenvalue as a phase 230, which can then be inferred classically, by a processor 160. The classical inference can be performed by the measuring component 168 by exploiting Bayes' law, as the probability of a particular phase 230 (φ), given outcome (E), a variance, σ, and a mean of the initial prior function. For example, Bayesian analysis can begin with a prior over φ, namely $P_0(\phi)$ and can proceed by the formulas below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i, m_i) = \frac{P(E_{i+1} \mid \phi; \theta_i, m_i) P_i(\phi)}{N}$$

P(φ) can be updated each sample by the update component 504.

The measuring component 168 can send its output to an update component 504. The measuring component 168 can execute on both the quantum processor 162 and processor 160. The update component 504 can receive the probabilistic output 508 of the measuring component 168 and utilize that probabilistic output 508 to provide a new upper bound 506 of the eigenvalue pair 145 to the measuring component 168. $|<\psi(\lambda)|H|\psi(\lambda)>|$ is the absolute value of the expectation value, which can be encoded as the phase of a quantum state, $|0>|\psi>$, quantum state 130 can be transformed by the encoding component 164 into $e^{-i<\psi(\lambda)|H|\psi(\lambda)>}|0>|\psi>$. The expression $<\psi|H|\psi>$ can also be expressed as:

$$\sum_{\lambda_1 \lambda_2 \in Spec(H)} \langle \psi | \psi_{\lambda_1} \rangle \langle \psi_{\lambda_1} | H | \psi_{\lambda_2} \rangle \langle \psi_{\lambda_2} | \psi \rangle \quad \text{Equation 4}$$

which is equivalent to $$\sum_{\lambda \in Spec(H)} \lambda |<\psi_\lambda | \psi>|^2 \quad \text{(Equation (5))}$$

Equation (4) and Equation (5) can be always greater than or equal to $$\sum_{\lambda \in Spec(H)} E_0 |<\psi_\lambda | \psi>|^2 = E_0. \quad \text{Equation (6)}$$

wherein $E_0$ is the minimum eigenvalue of H. VQE, employs this variational principle to search for the lowest eigenvalue by adjusting the variational parameters λ. At each stage of adjustment the expectation value needs to be calculated. The learning component 166 can utilize both stochastic inference and Bayesian inference to calculate the expectation value. After obtaining a sample, the posterior probability (P(φ|E, μ, σ)) of the Bayesian learning equation can be updated with a new variance (σ) and mean of the initial function (μ). Further, as σ and μ are updated by the update component 504, the measuring component 168 can be independent of a given initial state.

Figure 6:
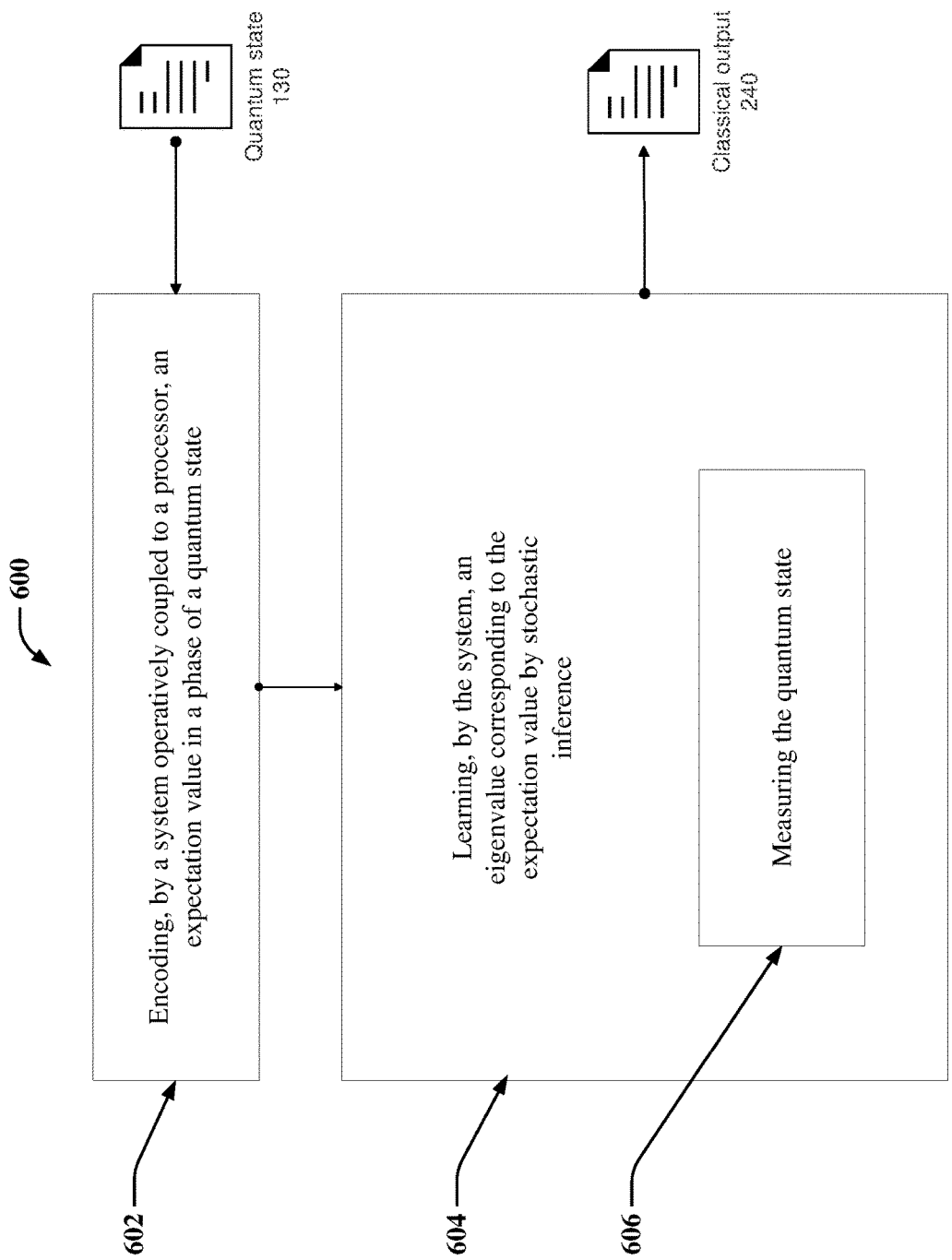
FIG. 6 illustrates a flow diagram of an example, non-limiting computer-implemented method that can generate an eigenvalue from a quantum state in accordance with one or more embodiments described herein.

FIG. 6 illustrates a flow diagram of an example, non-limiting computer-implemented method that can generate an eigenvalue from a quantum state in accordance with one or more embodiments described herein. Repetitive description of like elements employed in other embodiments described herein is omitted for sake of brevity. As shown by the diagram 600, at 602, a quantum state 130 can be encoded (e.g., via the encoding component 164). The quantum state 130 can be associated with technologies such as, but not limited to, quantum processing technologies, quantum circuit technologies, quantum computing design technologies, artificial intelligence technologies, machine learning technologies, search engine technologies, image recognition technologies, speech recognition technologies, model reduction technologies, iterative linear solver technologies, data mining technologies, healthcare technologies, pharmaceutical technologies, biotechnology technologies, finance technologies, chemistry technologies, material discovery technologies, vibration analysis technologies, geological technologies, aviation technologies, and/or other technologies. The quantum state 130 can be encoded as a phase 230. The encoding component can receive a quantum state for measuring 222 from a learning component 166. The encoding component can pass the phase 230 to the learning component 166. The encoding component 164 can a quantum state 130, which can be an at least partial eigenstate. The encoding component can send the quantum state 130 to an encoding circuit 210. The encoding circuit 210 can receive the quantum state 130 and input from the learning component 166. Utilizing the quantum state 130 and input from the learning component 166, the encoding circuit 210 can output a phase 230.

At 604, in one or more embodiments, learning component 166 can learn an eigenvalue corresponding to the expectation value by stochastic inference. Learning component 166 can receive a phase 230 from the encoding component 164. The learning component can pass a quantum state for measuring 222 based on the at least one ancilla qubit 205 to the encoding component 164. In one or more embodiments, quantum circuit 220 can depend on control parameters m and θ which in turn can depend on the probability/prior parameters μ and σ. The quantum circuit 220 encodes the at least one ancilla qubit 205 into a quantum state for measuring 222 and provides input to the encoding circuit 210. The quantum state for measuring 222 can be sent to the measuring component 168, which can measure to provide a classical output 240, which can be an eigenvalue pair 145. In one or more embodiments, learning component 166 can learn an eigenvalue corresponding to the expectation value by stochastic inference by a process that comprises measuring the quantum state 606 to produce an output comprising a probabilistic measurement.

Figure 7:
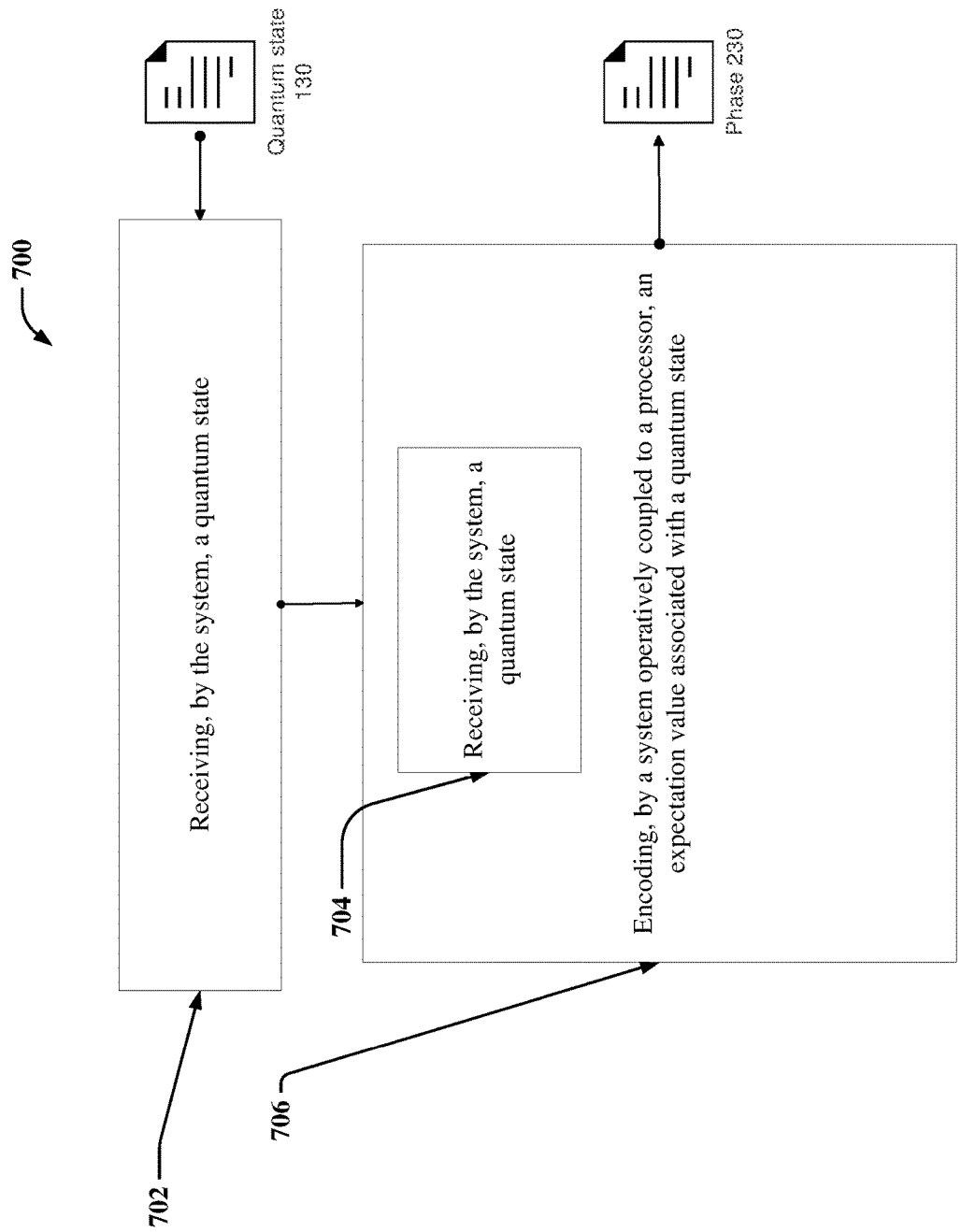
FIG. 7 illustrates a flow diagram of an example, non-limiting computer-implemented method that can encode a quantum state as a phase in accordance with one or more embodiments described herein.

FIG. 7 illustrates a flow diagram of an example, non-limiting computer-implemented method that can encode a quantum state 130 as a phase 230 in accordance with one or more embodiments described herein. Repetitive description of like elements employed in other embodiments described herein is omitted for sake of brevity. As shown in the block diagram 700, at 702, a quantum state can be received (e.g., by an encoding component 164 comprising an encoding circuit 300). The encoding circuit 300 passes the eigenstate to 304, which can be a conjugate of a unitary operator, P. P can be any unitary operator that can generate information that can be employed by the encoding circuit 300 to generate an inference of a spectrum. P can be a Hamiltonian. The output 305 of the conjugate of the unitary operator 304 goes to the conjugate of the circuit preparation circuit 306. The output of the circuit preparation circuit 306 goes to the first order projection operator 308. By way of example, the first order projection operator 308, π, can be represented as π=I−2|0><0|, wherein I is the identity matrix.

At 704, a quantum state for measuring 222 based on an at least one ancilla qubit 205 can be received (e.g., by an encoding component 164 comprising an encoding circuit 300). The quantum state for measuring 222 based on the at least one ancilla qubit 205 can be passed to both the conjugate of the unitary operator 304 and to a Hadamard gate 302. The Hadamard gate 302 can receive a single qubit and bring it to a state superposition where its output has an equal probability of being measured classically as either 0 or 1. The Hadamard gate can be represented as a unitary matrix that is a combination of two rotations, 180 degrees about the Z-axis and 90 degrees about the Y-axis. The output 303 of the Hadamard gate 302 can be also passed to the first order projection operator 308, π, can be represented as π=I−2|0><0|, wherein I is the identity matrix.

The output of the first order projection operator 308 can be passed to both another Hadamard gate 302 and to the circuit preparation circuit 310. As shown at the upper portion of FIG. 3, the output of the Hadamard gate 302 can be passed to both another Hadamard gate 302 and to a unitary operator 312. The output of the Hadamard gate 302 can be passed to another first order projection operator 308, which can be represented as π=I−2|0><0|. As shown at the bottom portion of FIG. 3, the output 309 of the first order projection operator 308 goes to a circuit preparation circuit 310. The output 311 of the circuit preparation circuit 310 goes to the unitary operator 312. The output 313 of the unitary operator 312 can be passed to the conjugate of the circuit preparation circuit 306. Like the output 303 of the Hadamard gate 302, the output 307 of the conjugate of the circuit preparation circuit 306 can be passed to the first order projection operator 308.

The output 303 of the first order projection operator 308 can be passed to a Hadamard gate 302 and to a circuit preparation circuit 310. This encoding circuit 300 can be iterated as necessary to reduce error in encoding a phase.

At 706, the quantum state can be encoded as a phase (e.g., by an encoding component 164 comprising an encoding circuit 300). The encoding component 164 can execute on a quantum processor 162. Iterations of the encoding circuit 300, can be represented mathematically as repeated iterations of S, where $S=S_0 S_1$, wherein $S_0 = V\pi V^\dagger = I - 2|\psi_0><\psi_0|$ and $S_1 = UV\pi V^\dagger U^\dagger = I - 2U|\psi_0><\psi_0|U^\dagger$. Iterations of S lead to encoding the expectation value as a phase, $\varphi(\lambda)$, wherein $\varphi(\lambda) = 2 \arccos(<\psi(\lambda)|H|\psi(\lambda)>)$. This can encode an expectation value of the quantum state 130, $|0>|\psi>$ as $e^{-i<\psi(\lambda)|H|\psi(\lambda)>}|0>|\psi>$, wherein $|<\psi(\lambda)|H|\psi(\lambda)>|$ can be an amplitude of the expectation value.

Figure 8:
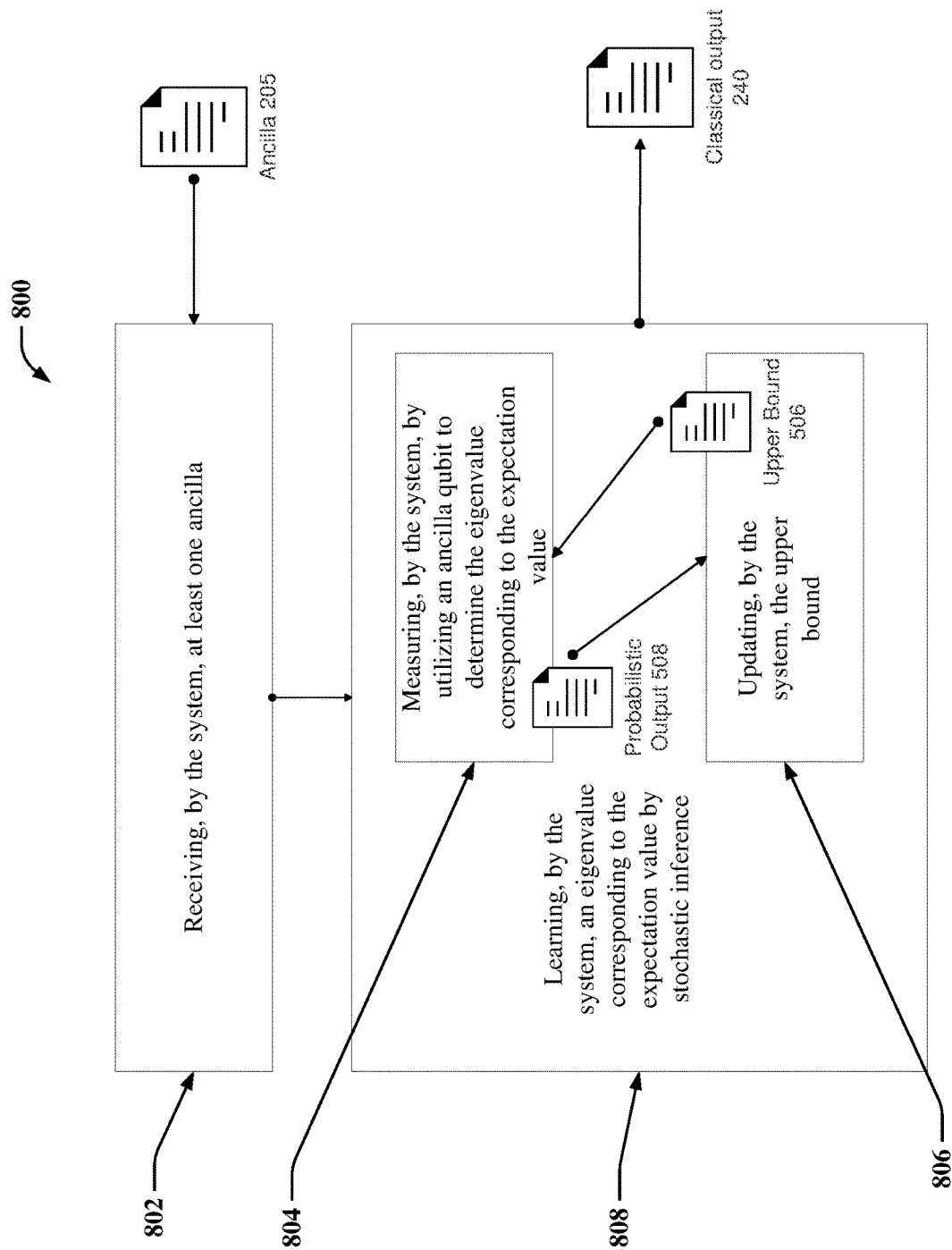
FIG. 8 illustrates a flow diagram of a computer-implemented method that can learn an eigenvalue corresponding to an expectation value based on a quantum state in accordance with one or more embodiments described herein.

FIG. 8 illustrates a flow diagram 800 of a computer-implemented method that can learn an eigenvalue corresponding to an expectation value based on a quantum state in accordance with one or more embodiments described herein. Repetitive description of like elements employed in other embodiments described herein is omitted for sake of brevity. At 802, the learning component 166 can receive an at least one ancilla qubit 205 (e.g. by a learning component 166 comprising a quantum circuit 220). In one or more embodiments, quantum circuit 220 can depend on control parameters m and θ which in turn can depend on the probability/prior parameters μ and σ. The quantum circuit 220 encodes at least one ancilla qubit 205 qubit into a quantum state for measuring 222 that can be received by the encoding component 164. The quantum circuit 220 encodes at least one ancilla qubit 205 qubit into a quantum state for measuring 222 that can be received by the measuring component 168. The quantum circuit 220 of the learning component can be executed on a quantum circuit operatively connected to a quantum processor 162.

At 804, the eigenvalue corresponding to the expectation value can be determined by measuring an ancilla qubit (e.g., via a measuring component 168). The learning component 166 can comprise a measuring component 168. The measuring component 168 can receive a quantum state for measuring 222 from the quantum circuit 220. The probability of a given eigenvalue pair 145, which can be a value corresponding to the expectation value of the quantum state 130, can be calculated explicitly on by the measuring component 168 according to the equations below, $$P(0 | \phi; \theta; m) = \frac{1 + \cos(m(\theta - \phi))}{2}$$

$$P(1 | \phi; \theta; m) = \frac{1 - \cos(m(\theta - \phi))}{2}$$

$$P_{i+1}(\phi | E_{i+1}; \theta_i; m) = \frac{P(E_{i+1} | \phi; \theta_i; m_i) P_i(\phi)}{N}$$

thereby measuring the eigenvalue probabilistically based on the at least one ancilla qubit. The measuring component can receive the phase 230 from the encoding component 164, represented as $\varphi(\lambda) = 2 \arccos(<\psi(\lambda)|H|\psi(\lambda)>)$.

The classical inference can be performed by the measuring component 168 by exploiting Bayes' law, as the probability of a particular phase 230 (φ), given outcome (E), a variance, σ, and a mean of the initial prior function. For example, Bayesian analysis can begin with a prior over φ, namely $P_0(\phi)$ and can proceed by the formulas below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i; m) = \frac{P(E_{i+1} \mid \phi; \theta_i; m_i) P_i(\phi)}{N}$$

$P(\phi)$ can be updated each sample by the update component 504.

At 806, the upper bound in the measuring component 168 can be updated (e.g., via an update component 504). The measuring component 168 can measure the eigenvalue pair 145 by Bayesian learning, which can include Bayesian inference. The classical inference can be performed by the measuring component 168 by exploiting Bayes' law, as the probability of a particular phase 230 (φ), given outcome (E), a variance, σ, and a mean of the initial prior function. For example, Bayesian analysis can begin with a prior over φ, namely $P_0(\phi)$ and can proceed by the formulas below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i; m) = \frac{P(E_{i+1} \mid \phi; \theta_i; m_i) P_i(\phi)}{N}$$

$P(\varphi)$ can be updated each sample by the update component 504.

The measuring component 168 can send its output to an update component 504. The measuring component 168 can execute on both the quantum processor 162 and processor 160. The update component 504 can receive the probabilistic output 508 of the measuring component 168 and utilize that probabilistic output 508 to provide a new upper bound 506 of the eigenvalue pair 145 to the measuring component 168. $|<\psi(\lambda)|H|\psi(\lambda)>|$ can be an amplitude on which the phase 230 can be encoded, as the quantum state 130, $|0>|\psi>$, can be encoded by the encoding component 164 as $e^{-i|<\psi(\lambda)|H|\psi(\lambda)>|}|0>|\psi>$. The expression $<\psi|H|>$ can also be expressed as:

$$\sum_{\lambda_1, \lambda_2 \in Spec(H)} <\psi|\psi_{\lambda_1}> <\psi_{\lambda_1}|H|\psi_{\lambda_2}> <\psi_{\lambda_2}|\psi> \quad \text{Equation (4)}$$

which is equivalent to $$\sum_{\lambda \in Spec(H)} \lambda |<\psi_\lambda|\psi>|^2 \quad \text{(Equation (5))}$$

Equation (4) and Equation (5) can be always greater than or equal to $$\sum_{\lambda \in Spec(H)} E_0 |<\psi_\lambda|\psi>|^2 = E_0. \quad \text{Equation (6)}$$

wherein $E_0$ can be representative of the quantum state 130. In this way, the learning component 166 can utilize both stochastic inference and Bayesian inference. After obtaining a sample, the posterior probability (P(φ|E, μ, σ)) of the Bayesian learning equation can be updated with a new variance (σ) and mean of the initial function (μ). Further, as σ and μ are updated by the update component 504, the measuring component 168 can be independent of an input state.

Figure 9:
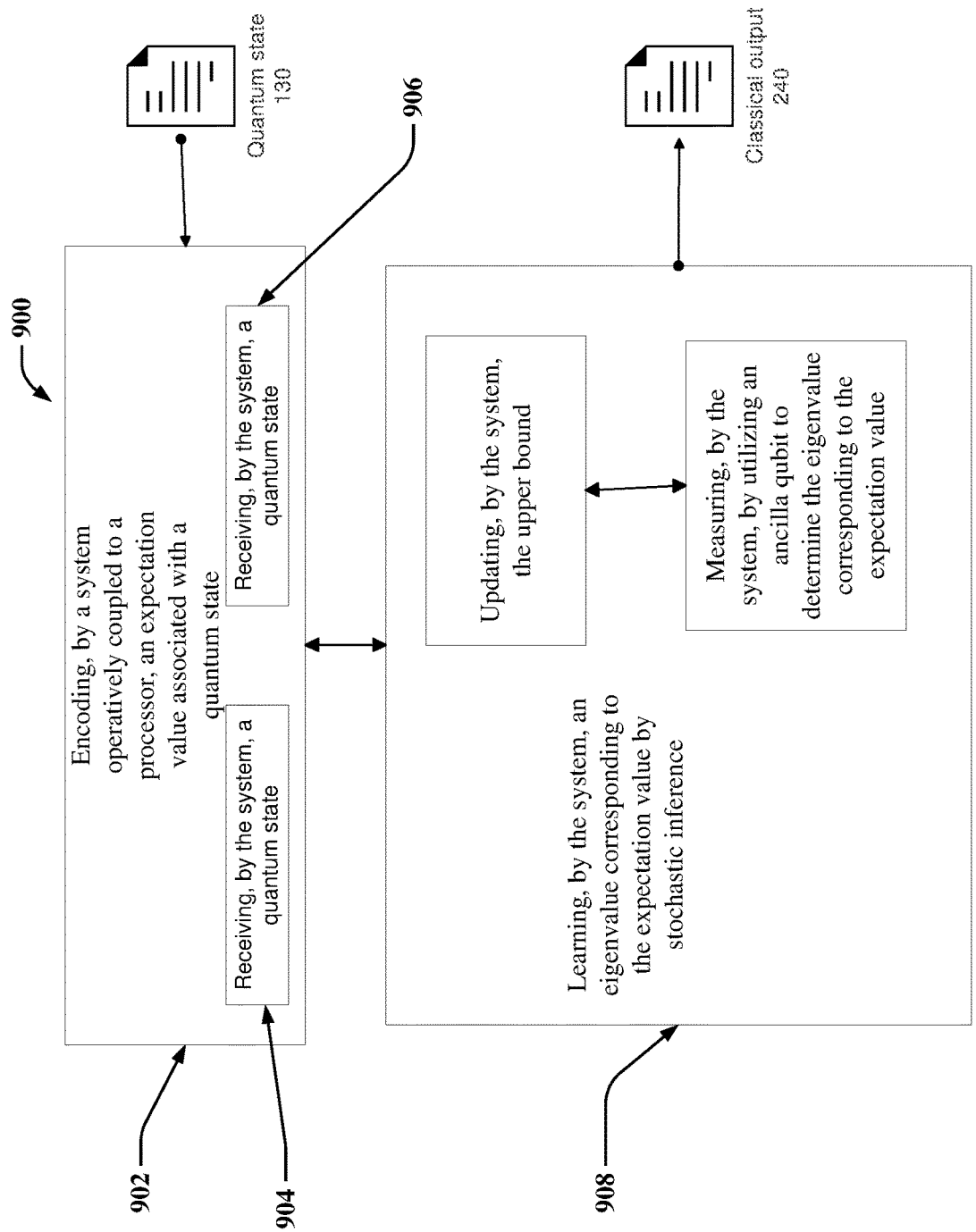
FIG. 9 illustrates a flow diagram of an example, non-limiting computer-implemented method that can generate an eigenvalue from a quantum state in accordance with one or more embodiments described herein.

FIG. 9 illustrates a flow diagram of an example, non-limiting computer-implemented method that can generate an eigenvalue from a quantum state in accordance with one or more embodiments described herein. Repetitive description of like elements employed in other embodiments described herein is omitted for sake of brevity. At 902, a quantum state 130 can be encoded as a phase. Encoding a quantum state as a phase 902 can include receiving a quantum state 904 and receiving a quantum state 906.

The quantum state 130 can be received by the encoding component 164. The encoding component 164 can encode the quantum state 130 as a phase 230 based on an amplitude of the expectation value of the quantum state 130. The phase 230 can be passed to a learning component 166. The encoding component can be executed by a quantum processor 162.

At 908, an eigenvalue corresponding to the expectation value can be learned, by the system, by stochastic inference (e.g., via a learning component 166). The learning component 166 can receive an at least one ancilla qubit 205. The at least one ancilla qubit 205 can be received by the quantum circuit 220 of the learning component 166. In one or more embodiments, quantum circuit 220 can depend on control parameters m and θ which in turn can depend on the probability/prior parameters μ and σ. The quantum circuit 220 encodes at least one ancilla qubit into a quantum state for measuring 222 that can be received by the encoding component 164. The quantum circuit 220 of the learning component can be executed on a quantum circuit operatively connected to a quantum processor 162.

The learning component 166 can comprise a measuring component 168. The measuring component 168 can receive a quantum state for measuring 222 from the quantum circuit 220. The probability of a given eigenvalue pair 145, which can be a value corresponding to the expectation value of the quantum state 130, can be calculated explicitly on by the measuring component 168 according to the equations below:

$$P(0 \mid \phi; \theta; m) = \frac{1 + \cos(m(\theta - \phi))}{2}$$

$$P(1 \mid \phi; \theta; m) = \frac{1 - \cos(m(\theta - \phi))}{2}$$

$$P_{i+1}(\phi \mid E_{i+1}; \theta_i; m) = \frac{P(E_{i+1} \mid \phi; \theta_i; m_i) P_i(\phi)}{N}$$

thereby measuring the eigenvalue probabilistically based on the at least one ancilla qubit. The measuring component can receive the phase 230 from the encoding component 164, represented as $\varphi(\lambda) = 2 \arccos(<\psi(\lambda)|H|\psi(\lambda)>)$.

The measuring component 168 can measure the eigenvalue pair 145 by Bayesian learning, which can include Bayesian inference. Exploiting Bayes' law, the probability of a particular phase 230 (φ) with a given eigenvalue (E), μ, and σ can be written as P(φ|E, μ, σ)=[P(E, μ, σ|φ) P(φ)]/[∫P(E, μ, σ|φ) P(φ)dφ]. P(φ) can be updated each sample by the update component 504.

The measuring component 168 can measure the eigenvalue pair 145 by Bayesian learning, which can include Bayesian inference. Exploiting Bayes' law, the probability of a particular phase 230 (φ) with a given eigenvalue (E), μ, and σ can be written as P(φ|E, μ, σ)=[P(E, μ, σ|φ) P(φ)]/[∫P(E, μ, σ|φ) P(φ)dφ]. P(φ) can be updated each sample by the update component 504.

The measuring component 168 can send its output to an update component 504. The measuring component 168 can execute on both the quantum processor 162 and processor 160. The update component 504 can receive the probabilistic output 508 of the measuring component 168 and utilize that probabilistic output 508 to provide a new upper bound 506 of the eigenvalue pair 145 to the measuring component 168. $|\langle\psi(\lambda)|H|\psi(\lambda)\rangle|$ can be an amplitude on which the phase 230 can be encoded, as the quantum state 130, $|0\rangle|\psi\rangle$, can be encoded by the encoding component 164 as $e^{-i\langle\psi(\lambda)|H|\psi(\lambda)\rangle}|0\rangle|\psi\rangle$. The expression $\langle\psi|H|\psi\rangle$ can also be expressed as:

$$\sum_{\lambda_1,\lambda_2 \in Spec(H)} <\psi|\psi_{\lambda_1}> \cdot <\psi_{\lambda_1}|H|\psi_{\lambda_2}> \cdot <\psi_{\lambda_2}|\psi> \quad \text{Equation (4)}$$

which is equivalent to $$\sum_{\lambda \in Spec(H)} \lambda |<\psi_\lambda|\psi>|^2 \quad \text{(Equation 5)}$$

Equation (4) and Equation (5) can be always greater than or equal to $$\sum_{\lambda \in Spec(H)} E_0|<\psi_\lambda|\psi>|^2 = E_0. \quad \text{Equation (6)}$$

wherein $E_0$ can be representative of the quantum state 130. In this way, the learning component 166 can utilize both stochastic inference and Bayesian inference. After obtaining a sample, the posterior probability (P(φ|E, μ, σ)) of the Bayesian learning equation can be updated with a new variance (σ) and mean of the initial function (μ). Further, as σ and μ are updated by the update component 504, the measuring component 168 can be independent of a given input state.

Moreover, because at least encoding an expectation value associated with a quantum state and learning, by the system, an eigenvalue corresponding to the expectation value by stochastic inference, etc. are established from a combination of electrical and mechanical components and circuitry, a human is unable to replicate or perform processing performed by the processor or quantum processor (e.g., the learning component, measuring component, encoding component, etc.) disclosed herein. For example, a human is unable to encode an expectation value, etc.

Moreover, because encoding, measuring, learning, updating, etc. and/or communication between processing components and/or an assignment component is established from a combination of electrical and mechanical components and circuitry, a human is unable to replicate or perform the subject measuring, learning, updating, etc. and/or the subject communication between processing components and/or a database component. For example, a human is unable to encode an expectation value associated with a quantum state as a phase on a system comprising a processor operatively coupled to memory, etc. Moreover, a human is unable to learn, by a system, an eigenvalue corresponding to the expectation value by stochastic inference, etc.

Figure 10:
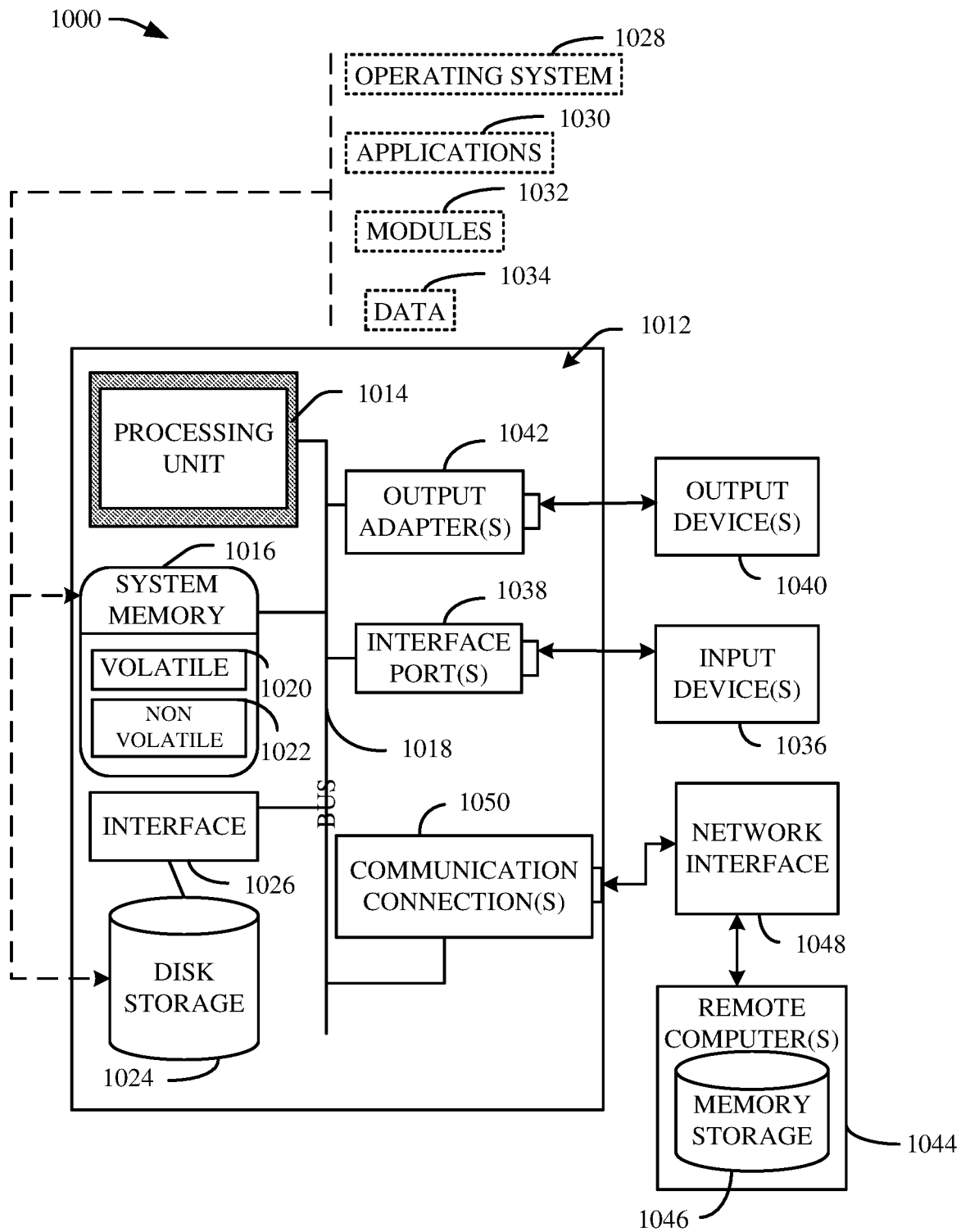
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
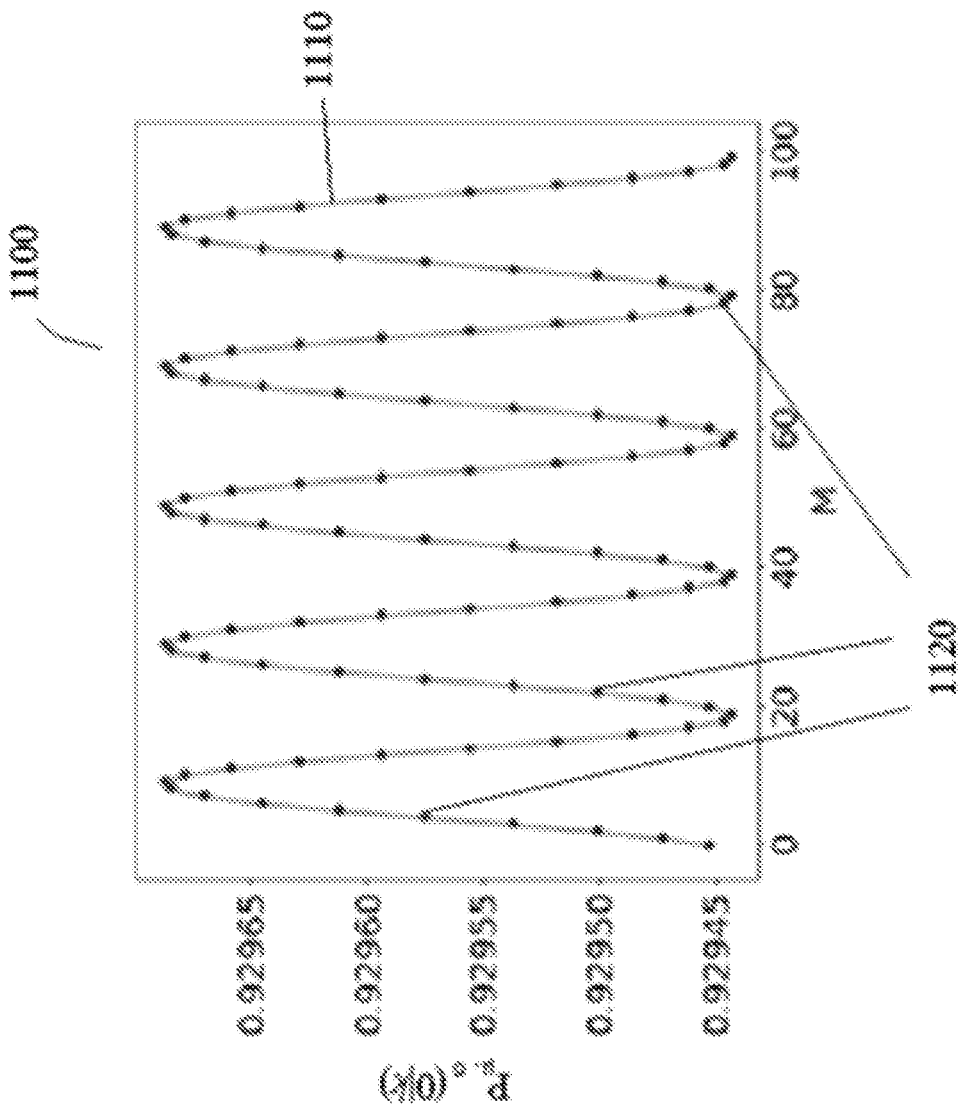
FIG. 11 illustrates an example, non-limiting graph showing an example probabilistic measurement of a phase in accordance with one or more embodiments described herein.

FIG. 11 illustrates an example, non-limiting graph showing an example probabilistic measurement of a phase in accordance with one or more embodiments described herein. Repetitive description of like elements employed in other embodiments described herein is omitted for sake of brevity. The graph 1100 shows plot points 1120 of the probabilistic measurement that can be done by the measuring component 168.

Quantum Bayesian Amplitude Estimation: One or more embodiments described herein can combine quantum expectation estimation with quantum Bayesian phase estimation, while avoiding problems associated with eigenvector collapse.

In contrast to the use of a full phase estimation or iterative phase estimation, one or more embodiments can use a non-trivial variant of a quantum Bayesian phase estimation process. In some uses of quantum Bayesian estimation, a state is initialised into an eigenvector. In contrast, in one or more embodiments, an S rotation operator and the initial state $|\psi_0\rangle$ can be used by selecting certain $\theta_i$ values. One or more embodiments can avoid a problem where $|\psi_0\rangle$ has components in the direction of both eigenvectors, that is, picking up both phases $\pm\phi$, and potentially preventing the ability to construct a single pair of likelihoods that is independent of the unknown eigenvector decomposition of the initial state. To avoid this result, one or more embodiments can select $\theta$ such that the likelihood is invariant under a sign change of $\phi$. In some implementations, this approach can leads to two possible choices $\theta \in \{0, \pi/2m\}$ These two choices allow that for any m (and higher m's can be used as precision improves) there can be significant statistical distinguishability between measuring a zero versus a one.

This can result, in some circumstances, because of differences between two outcome of either $\cos(m\phi)$ or $\sin(m\phi)$, with the larger of which being generally greater than $1/\sqrt{2}$.

One or more embodiments can be implemented where prior knowledge of the phase can be incorporated in order to speed up convergence. For example, in some uses of quantum homology, quantum expectation estimation can be used to calculate betti numbers, these being known to be integer values.

Maximizing Information Gain: One or more embodiments can analyze information gain as defined by the expected utility, where the utility is defined as the Kullback-Liebler divergence between the prior and posterior distributions. In one or more embodiments, this approach can yield useful formulations, as well as a novel understanding of the Kitaev protocol.

One or more embodiments can determine an expected utility by the difference between the entropy of the outcome of the experiment averaging out prior knowledge and the entropy taking into account prior knowledge. One approach to implementing this determination is to choose m and $\theta$ to maximise this expected utility. Because, in some circumstances, possible values of $\theta$ (given m) can be restricted to two, one or more embodiments can use the following approach to define the expected utility for these two choices of $\theta$. For example, with $\theta=0$:

$$EU(m_i, \theta_i = 0) = H\left(\frac{1}{2} + \frac{\pi}{2}\hat{P}_i^E(m)\right) - \int_{-\pi}^{\pi} H\left(\frac{1}{2} + \frac{\cos(m\phi)}{2}\right) P_i^E(\phi)d\phi$$

where $$\hat{P}_i^E(m) := \frac{1}{\pi}\int_{-\pi}^{\pi} \cos(m\phi)P_i(\phi)d\phi,$$

is the even Fourier component (the cosine component) of the prior at frequency m and $P_i^E(\phi):=(P_i(\phi)+P_i(-\phi))/2$ is the even part of the prior.

In another example, $\theta=\pi/2m$:

$$EU(m_i, \theta_i = \pi/2m) = H\left(\frac{1}{2} + \frac{\pi}{2}\hat{P}_i^O(m)\right) - \int_{-\pi}^{\pi} H\left(\frac{1}{2} + \frac{\sin(m\phi)}{2}\right) P_i(\phi)d\phi$$

Thus, in this example approach, an example optimal choice of θ and m is the one that maximises the maximum of the above two expressions.

The measuring component 168 can produce an accurate measurement without many samples by measuring intelligently. This probabilistic measurement can utilize Bayesian learning and stochastic inference upon the quantum results. This can be performed by updating a prior distribution using Bayes' law.

Based on this probabilistic distribution, the measuring component 168 can start from an initial Gaussian prior with mean $\mu$ and variance $\sigma^2$. Bayesian inference can be seen as an update of the prior distribution to produce the posterior distribution. As a result of the updated posterior distribution, measuring component 168 can replace the prior distribution with the posterior distribution. This process can be iterated for each of the random measurements in a data set.

Bayesian inference can be based on a discrete distribution. The discrete distribution can be obtained by sampling from a discrete set of samples based on a prior distribution. This can be done on a classical processor 160.

The measuring component 168 can measure for a given $\mu$ and $\sigma$, thereby observing the outcome $E \in \{0,1\}$ for a given number of i samples. For each sample, the measuring component 168 can obtain a phase $\phi_j$ and assign $\phi_j$ to $\Phi_{accept}$ with probability $P(E|\phi_j, \theta, M)/\kappa_E$, where $\kappa_E \in (0,1]$ is a constant constrained by $P(E|\phi_j, \theta, M)/\kappa_E \leq 1 \forall \phi_j, E$. Thereby, the measuring component 168 can return $\mu = \mathbb{E}(\Phi_{accept})$ and $\sigma = \sqrt{\mathbb{V}(\Phi_{accept})}$. As a first approximation and in order to reduce the Bayes risk, the measuring component 168 can choose $\mu = \lceil 1.25/\sigma \rceil$.

FIGS. 12A and 12B illustrate example, non-limiting graphs showing the samples for a given error $\epsilon$. and circuit depth for a given number of qubits.

As shown in FIG. 12A, the samples which can be employed to achieve a relatively low error $\epsilon$ are very high for VQE 1210. However, even at relatively low errors, γ-QPE 1220 compares quite well with QPE 1230, while not requiring the high fault tolerance of QPE.

As shown in FIG. 12B, the circuit depth for a given number of processed qubits goes up very quickly for QPE 1240. However, even at relatively high amounts of processing, γ-QPE 1260 compares favorably with VQE 1250.

While VQE and QPE scale well in different categories, the γ-QPE scales intermodally in both categories of precision and number of gates showing the tradeoff between precision (error) and circuit number (circuit depth). Allowing such continues steering lets one change the scaling depending on the tasks at hand giving an advantage in hard quantum inference tasks.

Eigenvalues can be a value of an observable physical quality of a linear operator operating on a Hilbert space. Eigenvalues can correspond to the expectation values of a quantum state in a Hilbert space. Classical and quantum algorithms facilitating the determination of these eigenvalues come with competing costs.

However, classical algorithms do provide some relative benefits to pure quantum algorithms. Where the ansatz of a quantum algorithm can be rigid and non-adaptive, the ansatz of a classical algorithm can be relatively flexible, bounded only by the ansatz span. Further, classical algorithms can be less dependent upon an input state than quantum algorithms, and do not require an extremely high fault tolerance.

While quantum algorithms have shown significant results in many areas, as the complexity of the problems increases, the rigidity and fault tolerance requirements of quantum algorithms becomes problematic. Therefore, a hybrid classical-quantum approach, such as γ-QPE, can incorporate some of the lower costs of both quantum and classical algorithms.

The system and/or the components of the system can be employed to use hardware and/or software to solve problems that are highly technical in nature (e.g., related to encoding, measuring, machine learning) that are not abstract and that cannot be performed as a set of mental acts by a human because they refer to specific machine processes. For example, a human cannot encode a quantum state as a phase on computer-readable medium, as a human cannot read a computer readable medium, or learn an eigenvalue associated with a quantum state on a computer-readable medium. Further, some of the processes, such as receiving a quantum state and measuring an ancilla probabilistically, can be performed by specialized computers facilitating carrying out defined tasks related to the quantum state estimation subject area. The system and/or components of the system can be employed to solve problems of greater complexity and that require greater computational power that arise through advancements in technology. The system can provide technical improvements to solving for eigenvalues by improving processing efficiency, reliability, and flexibility by providing a hybrid classical-quantum approach for quantum state estimation. In this way, the system can reduce errors in quantum state estimation by providing improved scaling and depth for a given processing cost, and thereby improve computer functionality in solving for eigenvalues which represent observables, etc.

The present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components; and
a processor that executes the computer executable components stored in the memory, wherein the computer executable components comprise:
a learning component that utilizes a hybrid approach that employs stochastic inference and Bayesian inference to iteratively determine an expectation value of a quantum state of an experiment in a quantum system based on an uncollapsed eigenvalue pair, wherein the learning component comprises a measuring component that probabilistically measures the expectation value, and wherein the measuring component is independent of an input quantum state of the experiment, and wherein the learning component employs a tuning parameter to adjust respective amounts of employment of the stochastic inference and the Bayesian inference to utilize at each iteration.

2. The system of claim 1, further comprising an encoding component that encodes the expectation value associated with the quantum state.

3. The system of claim 2, wherein the encoding component encodes the expectation value based on an amplitude of the expectation value.

4. The system of claim 3, wherein the encoding component encodes the expectation value as a phase.

5. The system of claim 1, wherein the tuning parameter is updated at one or more of the iterations.

6. The system of claim 1, wherein the measuring component utilizes a first ancilla qubit of a quantum processor to retrieve the uncollapsed eigenvalue pair.

7. The system of claim 6, wherein the measuring component interfaces between the processor and the quantum processor.

8. A computer-implemented method comprising:
determining, by a system operatively coupled to a processor, via a hybrid approach that employs stochastic inference and Bayesian inference to iteratively determine an expectation value of a quantum state of an experiment in a quantum system based on an uncollapsed eigenvalue pair, wherein the determining comprises:
probabilistically measuring, by the system, the expectation value independent of an input quantum state of the experiment, and
employing a tuning parameter to adjust respective amounts of employment of the stochastic inference and the Bayesian inference to utilize at each iteration.

9. The computer-implemented method of claim 8, further comprising encoding, by the system, the expectation value associated with the quantum state.

10. The computer-implemented method of claim 9, wherein the encoding comprises encoding the expectation value based on an amplitude of the expectation value.

11. The computer-implemented method of claim 10, wherein the encoding comprises encoding the expectation value as a phase.

12. The computer-implemented method of claim 8, wherein the tuning parameter is updated at one or more of the iterations.

13. The computer-implemented method of claim 8, wherein the probabilistically measuring comprises utilizing a first ancilla qubit of a quantum processor to retrieve the uncollapsed eigenvalue pair.

14. The computer-implemented method of claim 13, wherein the probabilistically measuring further comprises utilizing a second ancilla qubit of the quantum processor to retrieve the uncollapsed eigenvalue pair.

15. A computer program product for quantum state estimation, the computer program product comprising a computer readable storage medium having program instructions embodied therewith, the program instructions executable by a processor to cause the processor to:
determine, via a hybrid approach that employs stochastic inference and Bayesian inference to iteratively determine an expectation value of a quantum state of an experiment in a quantum system based on an uncollapsed eigenvalue pair, wherein the determining comprises:
probabilistically measure the expectation value independent of an input quantum state of the experiment, and
employ a tuning parameter to adjust respective amounts of employment of the stochastic inference and the Bayesian inference to utilize at each iteration.

16. The computer program product of claim 15, where the program instructions are executable by the processor to further cause the processor to encode the expectation value associated with the quantum state.

17. The computer program product of claim 16, wherein the encoding comprises encoding the expectation value based on an amplitude of the expectation value.

18. The computer program product of claim 17, wherein the encoding comprises encoding the expectation value as a phase.

19. The computer program product of claim 15, wherein the tuning parameter is updated at one or more of the iterations.

20. The computer program product of claim 15, wherein the probabilistically measuring comprises utilizing a first ancilla qubit of a quantum processor to retrieve the uncollapsed eigenvalue pair.

* * * * *